(12) United States Patent
Wu et al.

(10) Patent No.: US 11,892,609 B1
(45) Date of Patent: Feb. 6, 2024

(54) DIFFRACTION-LIMITED ULTRAWIDE ANGLE LENS FOR EXTENDED REALITY METROLOGY

(71) Applicant: MLOptic Corp, Redmond, WA (US)

(72) Inventors: Pengfei Wu, Bellevue, WA (US); Wei Zhou, Sammamish, WA (US)

(73) Assignee: MLOptic Corp., Redmond, WA (US)

( * ) Notice: Subject to any disclaimer, the term of this patent is extended or adjusted under 35 U.S.C. 154(b) by 0 days.

(21) Appl. No.: 18/244,881

(22) Filed: Sep. 11, 2023

(51) Int. Cl.
*G02B 9/64* (2006.01)
*G02B 13/22* (2006.01)
*G02B 13/00* (2006.01)
*G02B 5/20* (2006.01)

(52) U.S. Cl.
CPC ........... *G02B 13/0045* (2013.01); *G02B 9/64* (2013.01); *G02B 13/0055* (2013.01); *G02B 13/22* (2013.01); *G02B 5/205* (2013.01)

(58) Field of Classification Search
None
See application file for complete search history.

(56) References Cited

U.S. PATENT DOCUMENTS

| | | | | |
|---|---|---|---|---|
| 2011/0317284 A1* | 12/2011 | Imamura | ........ | G02B 15/145125 359/745 |
| 2012/0069441 A1* | 3/2012 | Fujimoto | ....... | G02B 15/144511 359/557 |
| 2014/0198394 A1* | 7/2014 | Komatsu | ........ | G02B 15/144109 359/686 |
| 2023/0168477 A1* | 6/2023 | Minefuji | ............ | G02B 15/1465 353/101 |

\* cited by examiner

*Primary Examiner* — Darryl J Collins
(74) *Attorney, Agent, or Firm* — Jong Patent Firm; Cheng Ning Jong; Tracy P. Jong

(57) ABSTRACT

A lens including a first lens group including three positive singlets and an achromatic doublet for collecting all field rays received at the first lens group while making initial corrections of spherical and color aberrations, a second lens group including a near-symmetrical group including two positive meniscus elements and two negative meniscus elements, wherein the second lens group is configured to correct distortions, a third lens group including two positive lenses with an air gap disposed between the two positive lenses, wherein the third lens group is configured to correct field curvature and astigmatism and a fourth lens group including a triplet and a positive meniscus element, wherein the fourth lens group is configured to correct spherical, coma, axial color and lateral color aberrations, wherein the lens is disposed in an order of the first lens group, the second lens group, the third lens group and the fourth lens group.

12 Claims, 37 Drawing Sheets

Detailed Optical Data

| Surface # | Radius of curvature (mm) | Thickness (mm) | Refractive index | Abbe number | Lens element |
|---|---|---|---|---|---|
| Stop 1 | Infinity | 10.000 | | | |
| 2 (A2) | -21.215 | 14.552 | 1.804 | 46.568 | positive meniscus |
| 3 (A3) | -23.111 | 0.014 | | | |
| 4 (A4) | -78.705 | 8.823 | 1.801 | 34.972 | positive meniscus |
| 5 (A5) | -37.876 | 0.853 | | | |
| 6 (A6) | 347.987 | 8.531 | 1.773 | 49.613 | biconvex |
| 7 (A7) | -88.601 | 0.015 | | | |
| 8 (A8) | 69.344 | 14.690 | 1.517 | 64.212 | Achromatic doublet |
| 9 (A9) | -39.593 | 13.402 | 1.801 | 34.972 | |
| 10 (A10) | -275.894 | 0.015 | | | |
| 11 (A11) | 32.476 | 18.000 | 1.588 | 61.284 | positive meniscus |
| 12 (B12) | 71.046 | 11.057 | | | |
| 13 (B13) | 79.359 | 16.425 | 1.959 | 17.472 | negative meniscus |
| 14 (B14) | 22.241 | 11.928 | | | |
| 15 (B15) | -11.873 | 5.438 | 1.517 | 64.212 | negative meniscus |
| 16 (B16) | -79.618 | 1.282 | | | |
| 17 (B17) | -45.288 | 10.864 | 1.804 | 46.568 | positive meniscus |
| 18 (B18) | -22.077 | 14.090 | | | |

*FIG. 2*

Detailed Optical Data

| Surface # | Radius of curvature (mm) | Thickness (mm) | Refractive index | Abbe number | Lens element |
|---|---|---|---|---|---|
| 19 (C19) | 108.645 | 18.000 | 1.801 | 34.972 | positive flint lens |
| 20 (C20) | -803.365 | 132.977 | | | |
| 21 (C21) | 142.755 | 18.000 | 1.569 | 71.304 | positive crown lens |
| 22 (C22) | -85.543 | 0.643 | | | |
| 23 (D23) | 59.125 | 1.999 | 1.773 | 49.613 | triplet |
| 24 (D24) | 26.241 | 16.034 | 1.569 | 71.304 | |
| 25 (D25) | -26.781 | 11.760 | 1.673 | 32.181 | |
| 26 (D26) | 131.490 | 7.652 | | | |
| 27 (D27) | -31.888 | 6.613 | 1.959 | 17.472 | Positive meniscus |
| 28 (D28) | -30.893 | 83.264 | | | |
| Image 29 | Infinity | 0.000 | | | |

*FIG. 3*

Spot Diagrams with 4-mm Aperture

Spot Diagrams with 3.5-mm Aperture

Diffracted-Limited MTF at 4-mm Aperture

Variable Virtual Distances

VD = 1m

-1D

VD = 2m

-0.5D

Variable Virtual Distances

VD = 5m

-0.2D

VD = infinity

0D

Variable Virtual Distances

VD = -2m

0.5D

VD = -1m

1D

DIFFRACTION-LIMITED ULTRAWIDE ANGLE LENS FOR EXTENDED REALITY METROLOGY

BACKGROUND OF THE INVENTION

1. The Field of the Invention

The present invention relates to an ultrawide angle lens. More specifically, the present invention is directed to a diffraction-limited ultrawide angle lens for eXtended Reality (XR) metrology.

2. Background Art

Emerging eXtended Reality (XR) is an umbrella term for all the immersive technologies, including Augmented Reality (AR), Virtual Reality (VR) and Mixed Reality (MR or MX), enabling the extension of the reality we experience by either blending virtual and real worlds or creating a fully immersive experience. For example, the XR systems are useful for creating three-dimensional (3D) virtual representations using Near-Eye Display (NED) technology, enabling the accurate placement of virtual objects in a virtual or augmented environment. In XR system design, two specific objectives need be achieved, increasing the field of view (FOV) while decreasing the device size, for better immersion experience and wearing comfortability. Ideally, XR glass should have a large FOV such as 100 degrees in a compact and lightweight design. However, it is challenging for not only designing XR components and subsystems but also integrating them as a system. Due to their small size and tight tolerances, small errors in manufacturing, assembling and alignment can degrade significantly the overall optical performance of XR devices. As such, each optical component and subassembly needs to be carefully evaluated to ensure the quality and performance of XR systems, enabling precise representations of virtual objects in the virtual or real world. However, such fundamental requirements also introduce a great challenge in XR evaluation process using optical metrology systems which are required to collect light emitted from tiny areas of XR optics in a wide range of angles without contacting the product. The measurements inevitably involve the processes of precise optical alignments, calibration and collision avoidance, as well as related data processing, which affects significantly the testing speed and the cost reduction especially in mass production metrology.

XR metrology involves the application of measurement techniques and tools within the context of augmented and virtual reality environments. An optical lens is the core element in XR metrological systems and needs to be specifically designed to ensure accurate measurements of sharpness, clarity, and color accuracy of the device under test (DUT). An innovative optics design with a large FOV is solicited to pick up all light in all field angles, mapping those ray bundles onto a single detector while minimizing optical aberration as well as color distortion, all of these techniques are critical for optical metrology such as modulation transfer function (MTF) and color measurements of XR devices. Lens designers use advanced materials, coatings, and optimization algorithms to achieve superior optical performance in a lens. In addition, the front optics in the metrology system needs be further reduced as compared to the conventional lens to avoid the geometrical conflict with DUTs for all eye-box locations as well as to facilitate binocular measurements.

More importantly, the optical lens system is required to have diffraction-limited performance covering the entire FOV of the measurements, enabling a complete evaluation of product quality for optical components as well as integrated systems. A single lens with high optical performances not only significantly simplifies the metrological system design but also expedites the test flow and thus reduce the overall cost. Compared to the metrological systems with multiple lenses and cameras such as using a dome camera structure, a single lens with one imaging sensor can significantly decrease the size of the metrological equipment while reducing the bandwidth requirements for data transportation and processing. It also eliminates unnecessary multiple optical alignments as well as complicated calibration processes.

For XR metrology, there are two specifications are critical, a first of which is the MTF measurement which is required to be diffraction-limited and the other is the FOV which should be close to about 100 degrees or large enough to cover the required field angles from the DUT, e.g., an optical component, a virtual display or a full glass system. The design of lenses also depends on several other factors. Some general considerations for lens specifications in AR/VR metrology include the focal length, entrance pupil, working distance, distortion, field curvature, chromatic aberration, relative illumination and magnification, etc. The focal length is determined based on the magnification, FOV and lens size. It shall be chosen based on measurement applications, e.g., virtual distances, display or object sizes as well as working distances. Longer focal lengths provide higher magnifications but may decrease the FOV. The lens aperture determines the amount of light entering an optical system. The pupil size should be able to match human eye pupils which are normally about 2-4 mm in diameter for XR metrological optics. A larger aperture allows more light collection, which can improve low-light performance but increase aberrations as well as resulting in shallower depth of field. Longer working distances may be required for some specific applications, however, the required lens diameter may be exceedingly large with a 100-degrees FOV. There is a tradeoff between the working distance, FOV and lens size. Lens distortion can impact the accuracy of metrology measurements. Minimizing distortion especially towards the edges, is important for precise measurements. It is difficult to optically and fully correct distortion, but it can be further improved in digital imaging processing. A lens projects the image in a curved rather than flat manner. Since all digital camera sensors are flat, the filed curvature needs to be as small as possible to capture the entire image in focus. A lens fails to focus all colors to the same point causing color fringing or blurring of objects. Chromatic aberrations need to be minimized and they are important for DUT color measurements especially for measuring small features such as micro-display and pixel arrays. Relative illumination describes the falloff of irradiance at a detector's periphery due to radiometric effects and thus it is important for luminance measurements. However, it can also be digitally corrected by using a Flat-field correction (FFC) method. The magnification factor is defined as the ratio of the size of an image compared to the object size. Depending on applications, different magnification factors may be required. For example, to measure a microLED panel in an XR light engine, it needs a microscope-like lens design.

A large FOV lens can suffer from various aberrations due to the complexity of the optics involved. Aberrations are imperfections in the lens that cause deviations from the ideal imaging performance. These aberrations can affect image quality and sharpness and thus the accuracy of XR metrology. Some common types of aberrations that can be encountered in large FOV lenses include spherical aberration, coma, astigmatism distortion, chromatic aberration and vignetting, etc. Spherical aberration occurs because a lens focuses light rays from different parts of the lens at different points. As a result, the image may appear soft or blurry, especially towards the edges of the frame. Coma causes off-axis light rays to appear as comet-like or wing-shaped aberrations, particularly in the corners of the image. This aberration can reduce the sharpness and clarity of the image. Astigmatism causes different focal lengths for light rays in different meridians, leading to distorted or elongated images, especially towards the edges of the frame. Distortion can result in straight lines appearing curved or bent in the image. Barrel distortion (lines bow outwardly) or pincushion distortion (lines bow inwardly) are common types of distortion. Chromatic aberration is also known as color fringing. This aberration occurs when different wavelengths of light are focused on different points. It can cause colored halos around high-contrast edges. Vignetting causes the corners of the image to appear darker than the center due to light falloff towards the edges of the lens. Correcting these aberrations is a challenging task, particularly for large FOV lenses because it involves intricate and precise optical designs. For XR metrology, the lens performance is required to be near perfect. Therefore, the above aberrations need to be well corrected and balanced to provide the desired diffraction-limited performance across the entire FOV. There exists a need for a single or unitary diffraction-limited ultrawide angle lens or lens system for XR metrology.

SUMMARY OF THE INVENTION

In accordance with the present invention, there is provided a lens including:
(a) a first lens group including three positive singlets and an achromatic doublet for collecting all field rays received at the first lens group while making initial corrections of spherical and color aberrations;
(b) a second lens group including a near-symmetrical group including two positive meniscus elements and two negative meniscus elements, wherein the second lens group is configured to correct distortions;
(c) a third lens group including two positive lenses with an air gap disposed between the two positive lenses, wherein the third lens group is configured to correct field curvature and astigmatism; and
(d) a fourth lens group including a triplet and a positive meniscus element, wherein the fourth lens group is configured to correct spherical, coma, axial color and lateral color aberrations,
wherein the lens is disposed in an order of the first lens group, the second lens group, the third lens group and the fourth lens group.

In one embodiment, one of the two positive lenses of the third lens group includes an Abbe number of greater than about 50-55. In one embodiment, one of the two positive lenses of the third lens group includes an Abbe number of less than about 50-55. In one embodiment, the lens further includes an entrance pupil of a diameter of about 2-4 mm and disposed at least about 10 mm from one end of the first lens group. In one embodiment, the three positive singlets include two positive meniscus lenses and one biconvex lens. In one embodiment, the lens further includes a neutral density (ND) filter disposed between the fourth lens group and an image plane upon which light rays through the lens are cast. In one embodiment, the lens further includes an XYZ filter disposed between the fourth lens group and an image plane upon which light rays through the lens are cast. In one embodiment, the lens further includes a switchable mirror disposed between the fourth lens group and an image plane upon which light rays through the lens are cast. In one embodiment, the lens further includes a beam splitter disposed between the fourth lens group and an image plane upon which light rays through the lens are cast. In one embodiment, the lens further includes one or more optical fibers disposed between the fourth lens group and an image plane upon which light rays through the lens are cast. In one embodiment, the lens further includes a back focal length of at least about 85 mm. In one embodiment, the lens is an image space near-telecentric lens.

An object of the present invention is to provide a diffraction-limited ultrawide angle lens for eXtended Reality (XR) metrology.

Another object of the present invention is to provide a unitary diffraction-limited ultrawide angle lens for XR metrology.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2 is a table listing a partial exemplary set of optical data suitable to form the lens shown in FIG. 1.

FIG. 3 is a table listing a partial exemplary set of optical data suitable to form the lens shown in FIG. 1.

PARTS LIST

Figure 1:
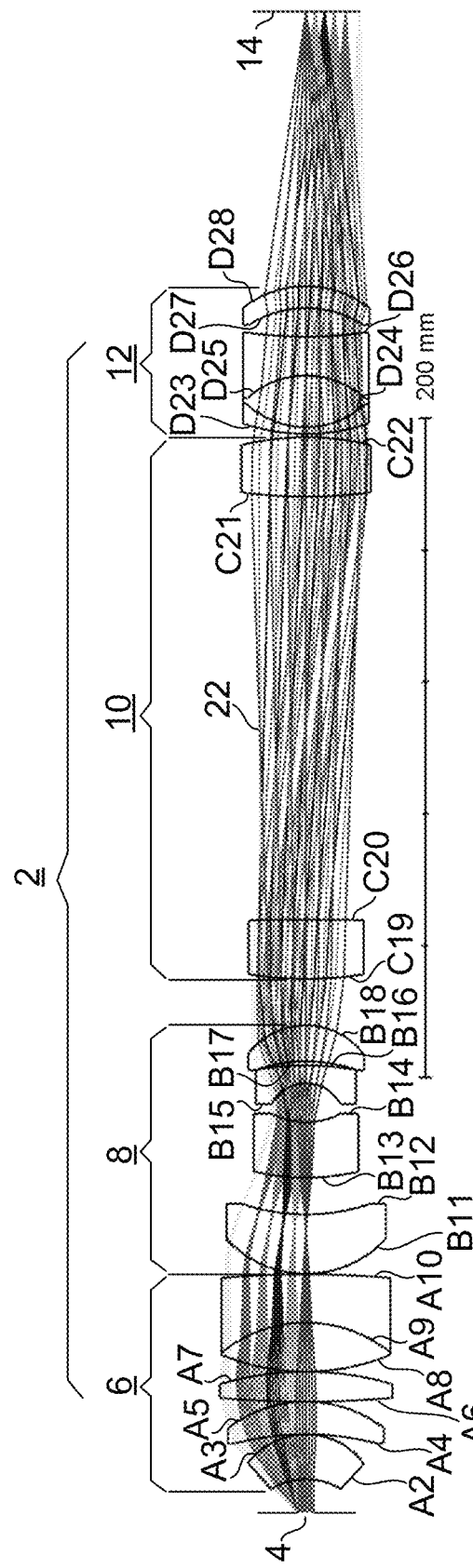
FIG. 1 is a present diffraction-limited ultrawide angle lens.

2—diffraction-limited ultrawide angle lens or lens system
4—entrance pupil
6—first lens group
8—second lens group
10—third lens group
12—fourth lens group
14—image plane
16—neutral density (ND) filters or other optics, e.g., a switchable mirror or a beam splitter
18— XYZ filters or other optics, e.g., optical fibers
20—line indicating diffraction limit
22—light rays PARTICULAR ADVANTAGES OF THE INVENTION The present lens provides diffraction-limited performance across the full field of view (FOV) under different apertures and various virtual distances. The present lens is an image space near-telecentric lens which is critical for most metrological applications including extended reality (XR) metrology. The present lens includes a long back focal is length of at least about 85 mm which is useful for accommodating different optics for various applications including colorimeters, spectral measurements and in-situ calibrations, etc. The relatively small size of the front lens enables measurements of different XR components and systems. The optical circle is less than about 35 mm, enabling the use of inexpensive sensors. The present lens is also relatively compact and simple in design. The present lens can be used for XR metrology to evaluate any devices or systems that produce virtual images, including light engines, micro-display modules, holographic waveguides, full Augmented Reality/Virtual Reality/Mixed Reality (AR/VR/MR) glasses and systems and head-up display (HUD) systems, etc. Compared to a small field of view (FOV) lens, it is much more difficult to design a diffraction-limited lens with a large FOV especially at or over 100 degrees which introduces large optical aberrations as well as distortions towards the edges.

As the present lens is useful for precisely mapping incoming ray angles to positions on an imaging plane, it can be used to detect birefringence and optical anisotropy of materials. In addition to XR metrology, the lens can be widely used in various scientific and industrial applications, e.g., birefringence analysis, petrography and geology, material characterization, liquid crystal display (LCD) development, fiber optic technology, microscopy, quality control, defect detection and crystallography, etc. In birefringence, the lens can be used to study birefringent materials. Birefringence refers to the property of a material to split light into two orthogonal polarization states, resulting in double refraction. With the present lens, researchers can visualize and measure the birefringent patterns, providing valuable information about the internal stresses, crystal structures, and other properties of the material. In petrography and geology, the lens can be used to identify and analyze the optical properties of minerals and rocks. The birefringent patterns observed with the lens can help identify mineral species and textures, aiding in the identification and classification of geological samples. In material characterization, the lens can be used in materials science for the characterization of crystalline structures and phase transitions in various materials, including polymers, liquid crystals and crystals. This information is crucial for understanding the material's behavior under different conditions. In LCD development, the lens can be used in the research and development of LCDs, as these displays rely on liquid crystals and polarization effects. By using the present lens, engineers can assess the performance and quality of LCD panels during the manufacturing process. In the field of fiber optics, the present lens can be used to inspect and analyze the polarization properties of light propagating through optical fibers. The information is important for optimizing signal transmission and minimizing signal distortions in fiber optic communication systems. In polarized light microscopy, such lens can be used to enhance the contrast and visualization of birefringent samples, revealing intricate details that might not be easily seen with conventional microscopy techniques. The lens can be used in quality control processes, especially in industries where birefringence and anisotropy play a role in material performance. By inspecting samples with the present lens, manufacturers can detect defects, stresses or irregularities that may impact the material's functionality. In crystallography, the lens can be used to determine crystal symmetry and orientation, providing valuable information for crystal structure analysis. In summary, the lens is a versatile tool useful across multiple disciplines.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

The term "lens" is used herein to mean a single or unitary lens or a system of lenses configured to cooperate to perform one or more optical functions as a unit.

Figure 4:
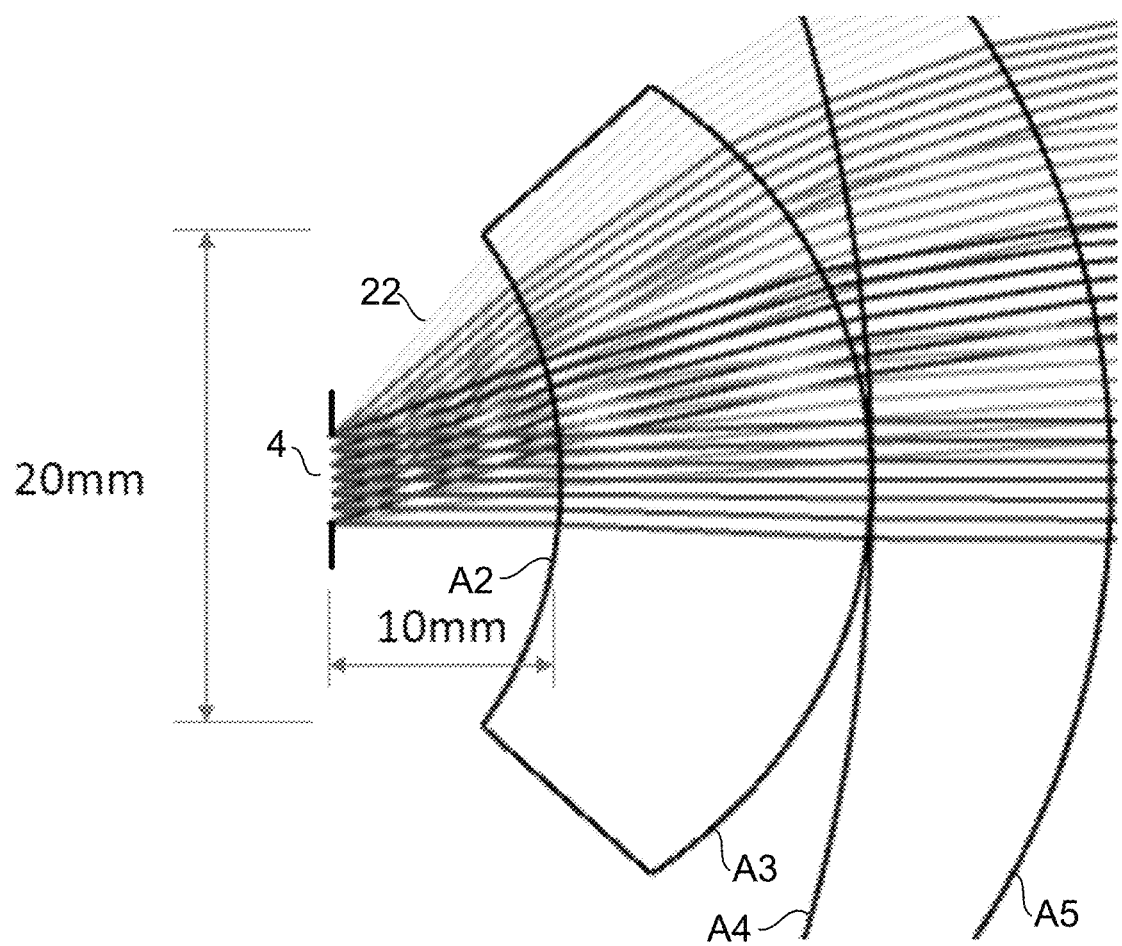
FIG. 4 is a partial diagram depicting the front lens geometry of the lens shown in FIG. 1.

FIG. 1 is a present diffraction-limited ultrawide angle lens 2. The lens 2 includes a first lens group 6, a second lens group 8, a third lens group 10 and a fourth lens group 12. FIG. 2 is a table listing a partial exemplary set of optical data suitable to form the first two lens groups 6, 8 shown in FIG. 1. FIG. 3 is a table listing a partial exemplary set of optical data suitable to form the last two lens groups 10, 12 shown in FIG. 1. The first lens group 6 includes three positive singlets and an achromatic doublet for collecting all field rays received at the first lens group 6 while making initial corrections of spherical and color aberrations. The first lens group 6 tends to cause a large distortion which is then corrected by one or more other lens groups. The three positive singlets include two positive meniscus lenses and one biconvex lens. The second lens group 8 includes a near-symmetrical group including two positive meniscus elements and two negative meniscus elements, wherein the second lens group is configured to correct distortions caused in one or more lens groups of the lens 2. The third lens group 10 includes two positive lenses with an air gap disposed between the two positive lenses, wherein the third lens group is configured to correct field curvature and astigmatism. The fourth lens group 12 includes a triplet and a positive meniscus element, wherein the fourth lens group is configured to correct spherical, coma, axial color and lateral color aberrations. The lens 2 is disposed in an order of the first lens group 6, the second lens group 8, the third lens group 10 and the fourth lens group 12 with an aperture 4 disposed at the front end of the lens 2, i.e., in front of the lens 2 at one end of the first lens group 6. In particular, the first lens group 6 includes two positive meniscus lenses, a biconvex lens and an achromatic doublet which collectively include surfaces A2, A3, A4, A5, A6, A7, A8, A9 and A10. The second lens group 8 includes a positive meniscus lens followed by two negative meniscus lenses and a positive meniscus lens which collectively include surfaces B11, B12, B13, B14, B15, B16, B17 and B18. The third lens group 10 includes a positive flint lens and a positive crown lens which collectively include surfaces C18, C19, C20, C21 and C22. In determining the type of lens useful for constructing this lens group, the required Abbe number of a lens is examined. For a positive lens of Abbe number of greater than about 50 generally and more specifically about 55, crown glass is used. For a positive lens of Abbe number of under about 55 generally and more specifically about 50, flint glass is used. The fourth lens group 12 includes a triplet lens and a positive meniscus lens which collectively include surfaces D23, D24, D25, D26, D27 and D28. FIG. 4 is a partial diagram depicting the front lens geometry of the lens shown in FIG. 1. The lens 2 further includes a front lens geometry is including an entrance pupil or aperture 4 of a diameter of about 2-4 mm and disposed at least about 10 mm from the front face of lens, i.e., surface A2 at one end of the first lens group 6, both of which parameters are necessary for the lens 2 to collect all light rays from an eye box or the exit pupil of a device under test (DUT), e.g., micro-display panel to avoid the risk of collision with the DUT. An optical stop can be placed in the front of the lens to match human eye pupil. In one example, the total length of the lens 2 is about 450 mm. The working distance, i.e., the distance between the entrance pupil 4 and the first front lens is at least about 10 mm. In one embodiment, the largest diameter of an optical element of the lens is less than about 50 mm. The back focal distance is at least about 85 mm. The effective focal length (EFFL) is about 15.6 mm. The angular FOV half angle is about ±50 degrees. In one embodiment, upon corrections by various lens groups, the distortion is less than about 12% at ±50 degrees. The Modulation Transfer Function (MTF) is close to diffraction limits across the FOV. The lens is compatible with the specific requirements of the XR and near eye display (NED) systems. Light of wavelengths of around 450 nm, 520 nm and 640 nm spectral bands are commonly used for the RGB light sources in Augmented Reality/Virtual Reality (AR/VR) microdisplays and systems.

Figure 5:
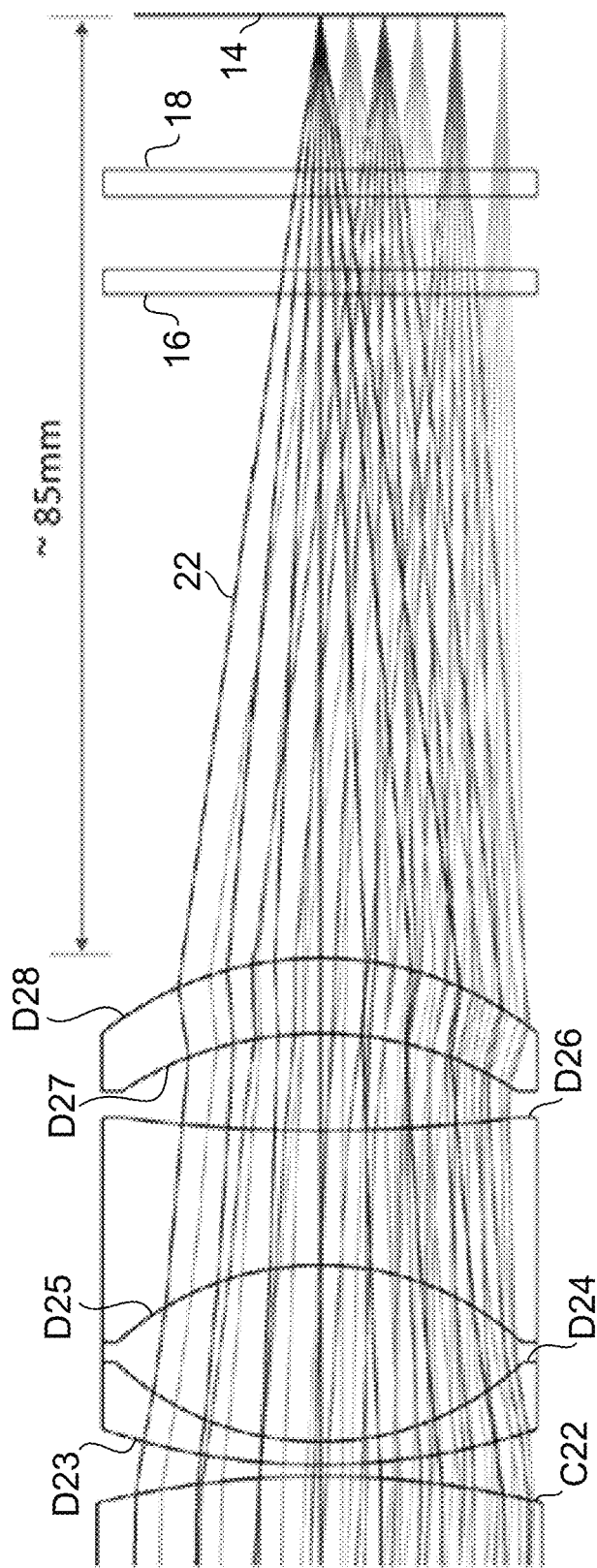
FIG. 5 is a partial diagram depicting the long back focal distance of the lens shown in FIG. 1.
Figure 6:
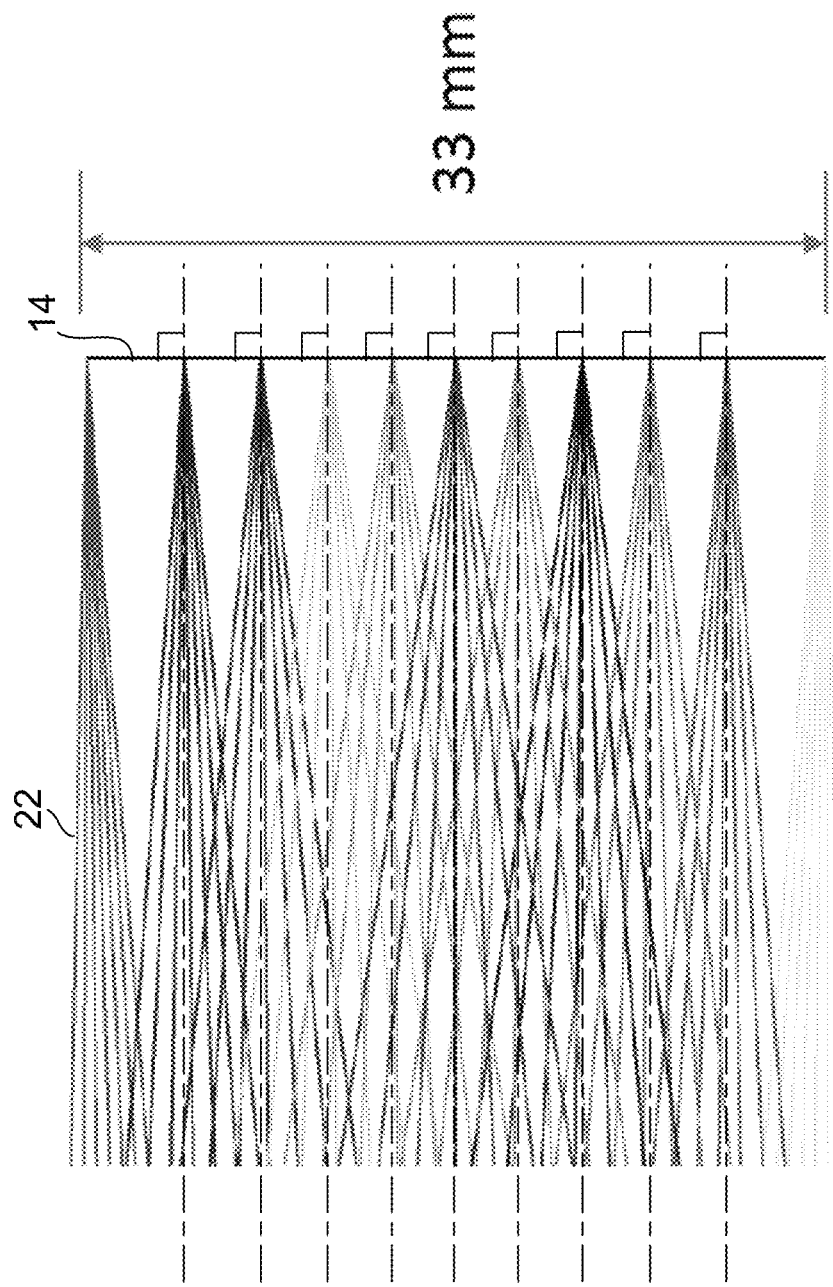
FIG. 6 is a partial diagram depicting the optical circle of the lens shown in FIG. 1 which makes it suitable for use with relatively small and inexpensive sensors.

FIG. 5 is a partial diagram depicting the long back focal distance, e.g., about 85 mm, of the lens shown in FIG. 1, a distance sufficient to accommodate optical elements, e.g., filters, in the optical path. The present lens 2 is configured to provide sufficient space for placing other optics or optical channels for in-situ spectral measurements or real-time calibration of chromaticity and luminance, etc. For instance, a neutral density (ND) is filter useful, e.g., for measurements of different DUTs with various brightness levels that may range from several nits to millions of nits, may be disposed as element 16 in the optical path of the lens 2 within the back focal distance between the fourth lens group 12 and an image plane 14 upon which the light rays through the lens 2 is cast. In another example, an XYZ filter useful, e.g., for colorimeter applications, may be disposed as element 18 within this space concurrently with the ND as shown in FIG. 5. FIG. 6 is a partial diagram depicting the optical circle of the lens shown in FIG. 1 of no larger than about 33 mm in diameter which makes it suitable for use with relatively small and inexpensive sensors. It shall be noted that the lens 2 is an image space near-telecentric lens as the chief rays are cast upon the image plane 14 at angles approaching right angles of less than about 2.3 degrees which eliminate any errors, e.g., optical center shift and color shift on an image sensor, etc. As such, this provides much larger mechanical tolerances for the present lens when switching the XYZ and ND filters or routing optical channels during measurement processes. The use of other lenses and filters within this space is possible provided the use of such lenses or filters does not alter the lens as a diffraction-limited ultrawide angle lens and near-telecentricity of the chief rays cast upon the image plane 14. For an ultrawide angle lens used in optical metrology, the image size is normally enlarged to achieve an enhanced optical performance. However, this requires a very large sensor format, typically over about 45 mm or even 60 mm in optical diameter. Such sensors are specifically designed and extremely expensive due to technological difficulty and low volume manufacturing as compared to conventional sensors used in machine vision of which the optical diameter is normally below about 35 mm. In contrast, the present optical circle on the image plane is about 33 mm in diameter. As such, inexpensive sensors with a 35 mm format or smaller can be used depending on the applications. These sensors can be easily obtained from most major camera suppliers. In one embodiment, a switchable mirror or a beam splitter may be disposed as element 16 for in-situ optical calibrations. In one embodiment, a single or multiple optical fibers, may be disposed as element 18 for spectra, chromaticity and/or luminance measurements.

Diffraction refers to the bending of light waves as they encounter an obstacle or aperture, e.g., the aperture of a lens, etc. This bending of light occurs because light behaves as a wave, and when a wavefront encounters an obstacle or aperture, it diffracts. When the aperture size is on the order of or smaller than the wavelength of light, significant diffraction occurs. This results in a spreading or blurring of the light as it passes through the aperture. Due to diffraction, the smallest point to which a lens can focus a beam of light is the size of the Airy disk. The radius (r) of the first-order diffraction ring of the point spread function (or Airy disk) is expressed by the equation:

$$r = 1.22 \lambda f/D$$

where $\lambda$ is the wavelength, f is the effective focal length of the lens and D is the diameter of the lens aperture.

Figure 7:
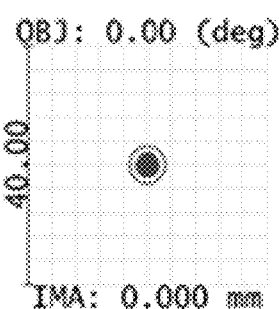
FIG. 7 are spot diagrams depicting a diffraction-limited performance of the lens shown in FIG. 1 with a 4-mm aperture.
Figure 7:
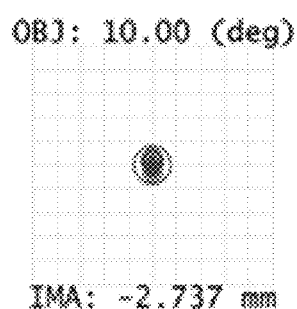
Figure 7:
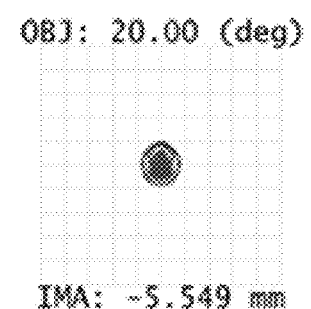
Figure 7:
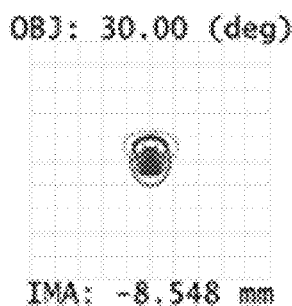
Figure 7:
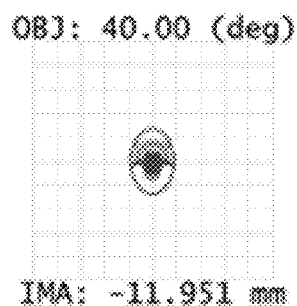
Figure 7:
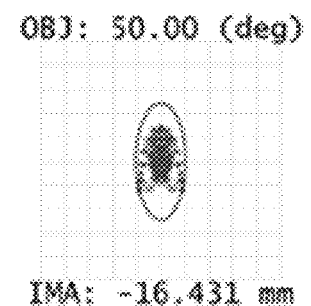
Figure 7:
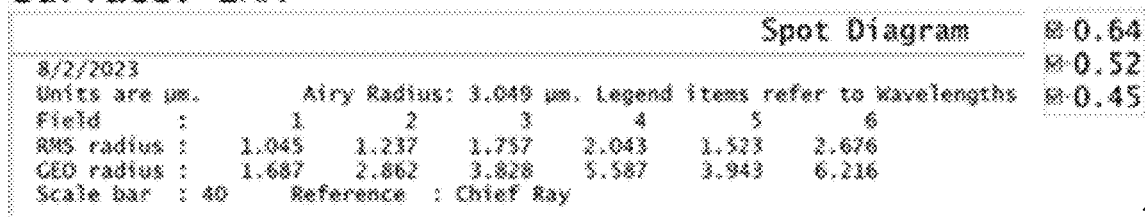
Figure 8:
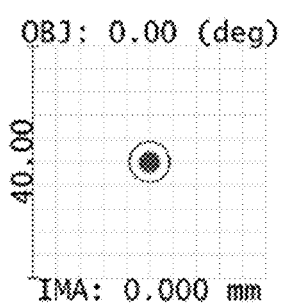
FIG. 8 are spot diagrams depicting a diffraction-limited performance of the lens shown in FIG. 1 with a 3.5-mm aperture.
Figure 8:
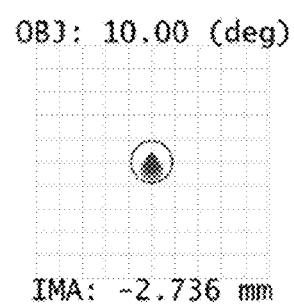
Figure 8:
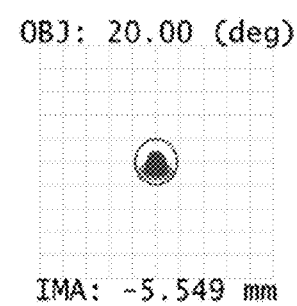
Figure 8:
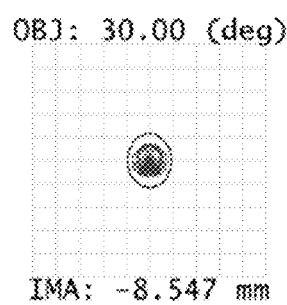
Figure 8:
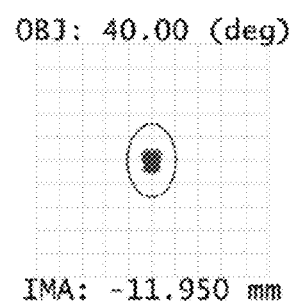
Figure 8:
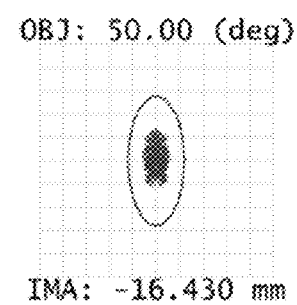
Figure 8:
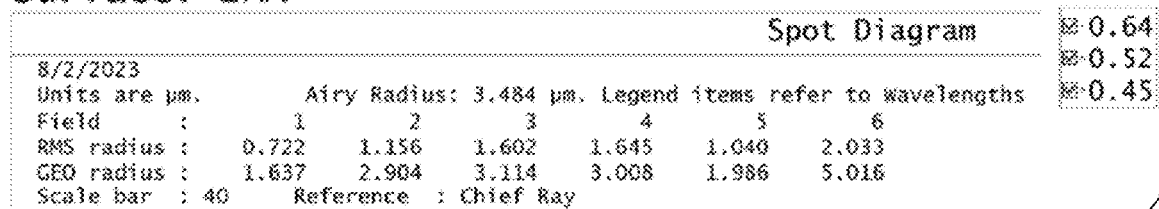
Figure 9:
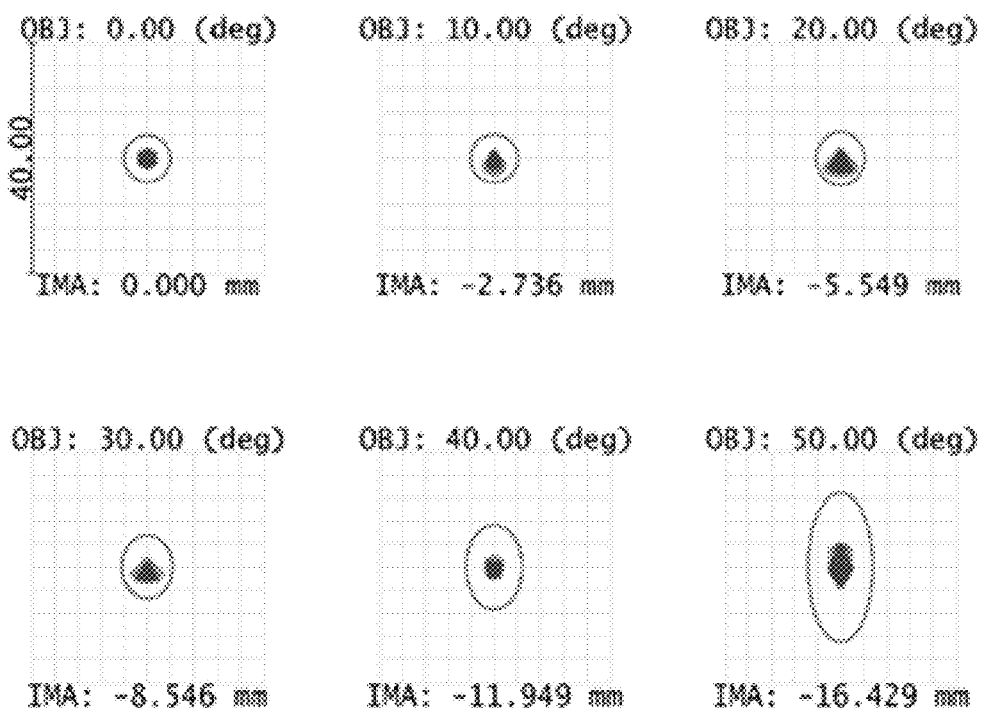
FIG. 9 are spot diagrams depicting a diffraction-limited performance of the lens shown in FIG. 1 with a 3-mm aperture.
Figure 10:
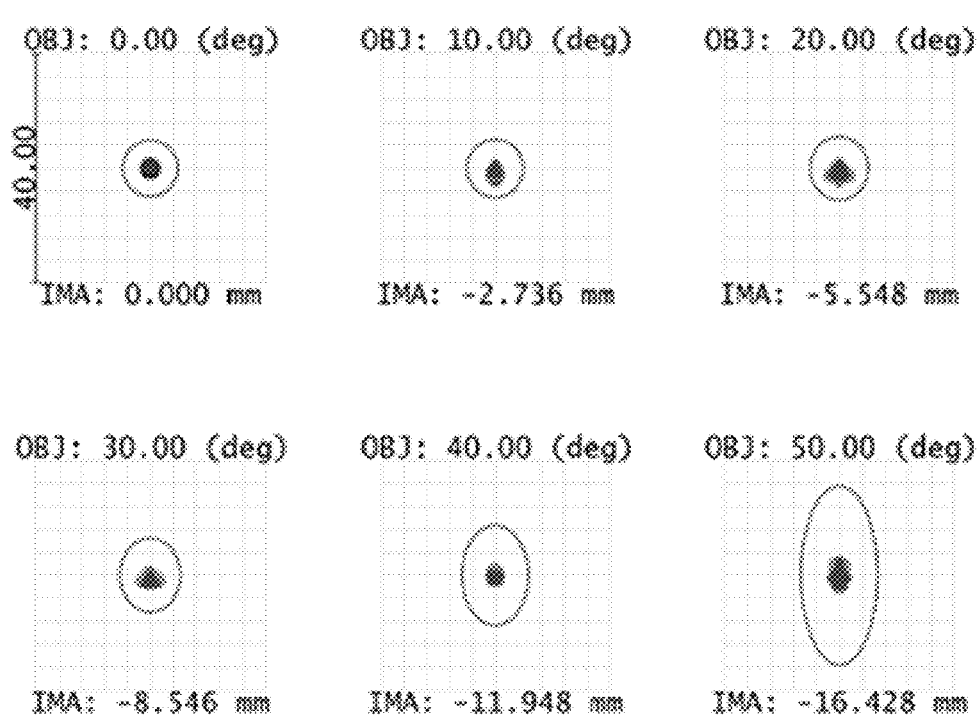
FIG. 10 are spot diagrams depicting a diffraction-limited performance of the lens shown in FIG. 1 with a 2.5-mm aperture.
Figure 10:
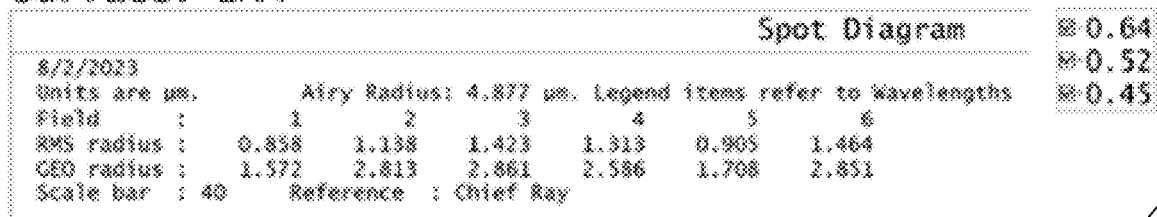

However, due to various aberrations, especially for a wide angle lens, the actual optical spot on the image plane will be enlarged, causing an image formed as a result of casting light rays through the lens to be blurry, with a decreased MTF performance. To correct those aberrations, multiple lenses including singlets, doublets and triplets with different curvature radius, thickness as well as certain type of glass (both refractive index and Abbe number), are required. FIG. 7 are spot diagrams depicting a diffraction-limited performance of the lens shown in FIG. 1 with a 4-mm aperture. FIG. 8 are spot diagrams depicting a diffraction-limited performance of the lens shown in FIG. 1 with a 3.5-mm aperture. FIG. 9 are spot diagrams depicting a diffraction-limited performance of the lens shown in FIG. 1 with a 3-mm aperture. FIG. 10 are spot diagrams depicting a diffraction-limited performance of the lens shown in FIG. 1 with a 2.5-mm aperture.

Figure 11:
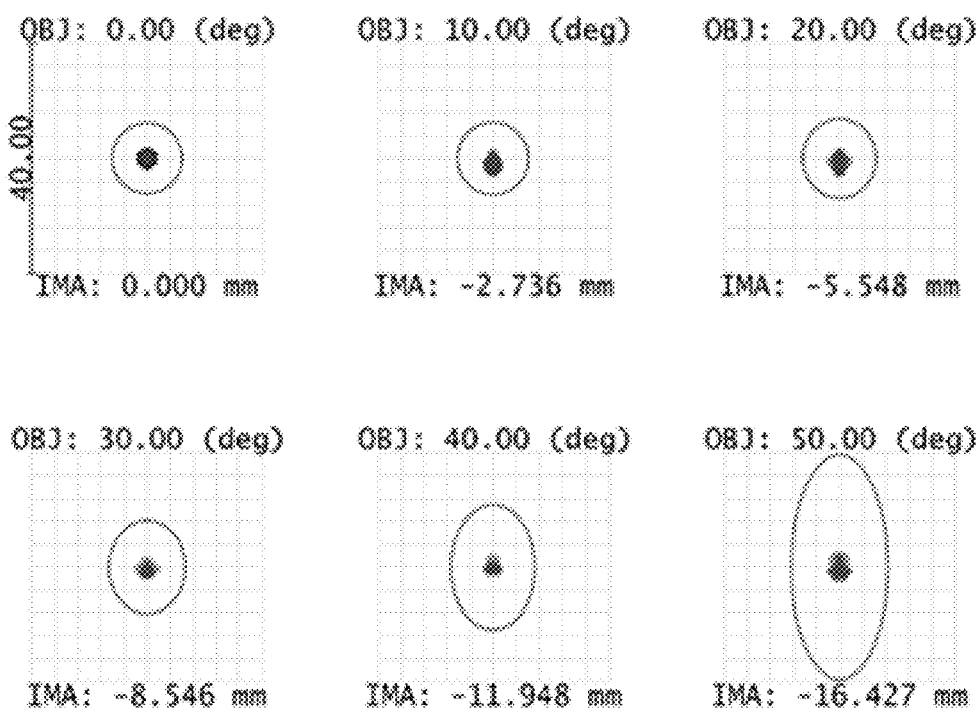
FIG. 11 are spot diagrams depicting a diffraction-limited performance of the lens shown in FIG. 1 with a 2-mm aperture.

FIG. 11 are spot diagrams depicting a diffraction-limited performance of the lens shown in FIG. 1 with a 2-mm aperture. The dark circle in each diagram is an Airy disk which is the best-focused spot of light that a perfect lens with a circular aperture can make, limited by the diffraction of light. The spot diagrams show the lens has diffraction-limited performance across full FOV. From spot diagrams, one can see the Airy disk looks slightly elliptical especially at the largest field angle. The main reason is that the optical stop is placed at the front of the present lens to match the human eye pupil for the XR metrology. This specific requirement introduces an optical asymmetry about the stop and thus produces a relatively large distortion. The more the distortion is corrected, the more elliptical the Airy disk will be. In addition, the near-telecentric feature at imaging space is also desirable for many applications including chromaticity and luminance measurements where XYZ filters and various ND filters need to be placed between the lens 2 and the image plane 14, e.g., of an imaging sensor. Although the chief ray angles towards large fields can be increased to reduce the elliptical shape of Airy disk to some degree, an image-space telecentric lens keeps the chief rays from the back surface of the last lens being incident normally to the imaging plane 14. Therefore, there is a tradeoff in the lens design specifically for XR metrological applications. There are several key specifications that need to be first considered in the design. For instance, the MTF performance must be near diffraction-limited, an FOV of at least about 100 degrees is better able to fully cover various AR devices, an image-space telecentricity is critical for the measurements of XR and NED devices, a distortion should be kept as small as possible and the lens design must also consider form factor constraints while maintaining optical performance. It is impossible to meet perfectly and completely all the requirements, but these are factors which must be considered and balanced with other requirements for AR metrological applications. In addressing diffraction concerns, once all rays from a certain FOV have been found to land on the image plane within the Airy disk (the dark circle in the spot diagrams), the lens is said to have been diffraction-limited. Other performance indicators, e.g., MTF curves, field curvature and distortion, lateral color, longitudinal aberration shall be monitored to ensure the optical performance of the lens meets its intended targets.

Figure 12A:
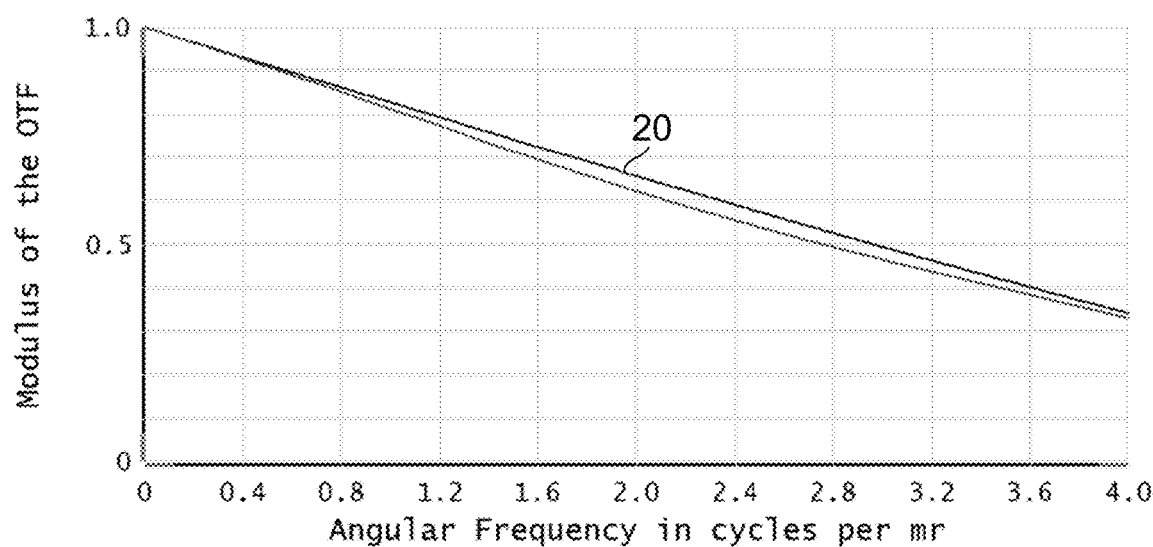
FIG. 12A is a diagram depicting the modulus of the optical transfer function (OTF) with respect to angular frequency at different field angles, depicting the lens' diffraction-limited modulation transfer function (MTF) at a 4-mm aperture.
Figure 12A:
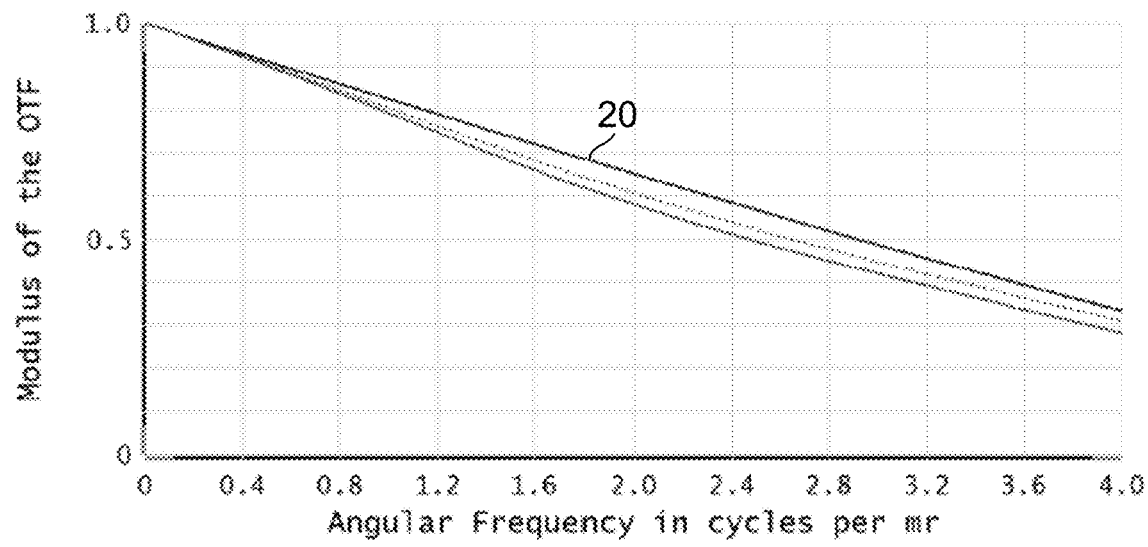
Figure 12B:
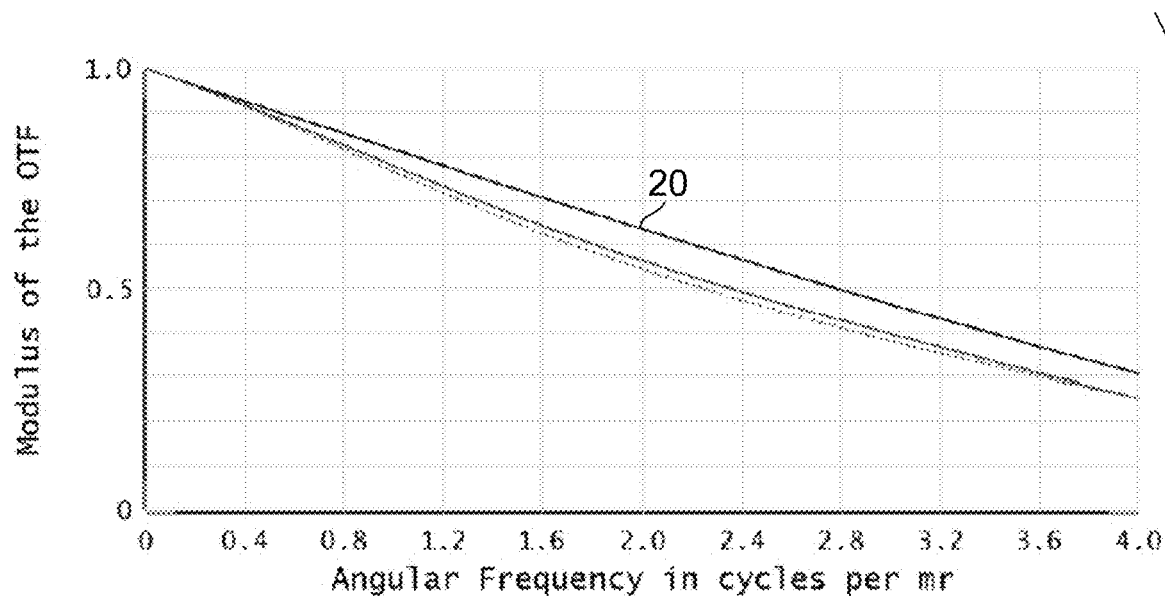
FIG. 12B is a diagram depicting the modulus of the OTF with respect to angular frequency at different field angles, depicting the lens' diffraction-limited MTF at a 4-mm aperture.
Figure 12B:
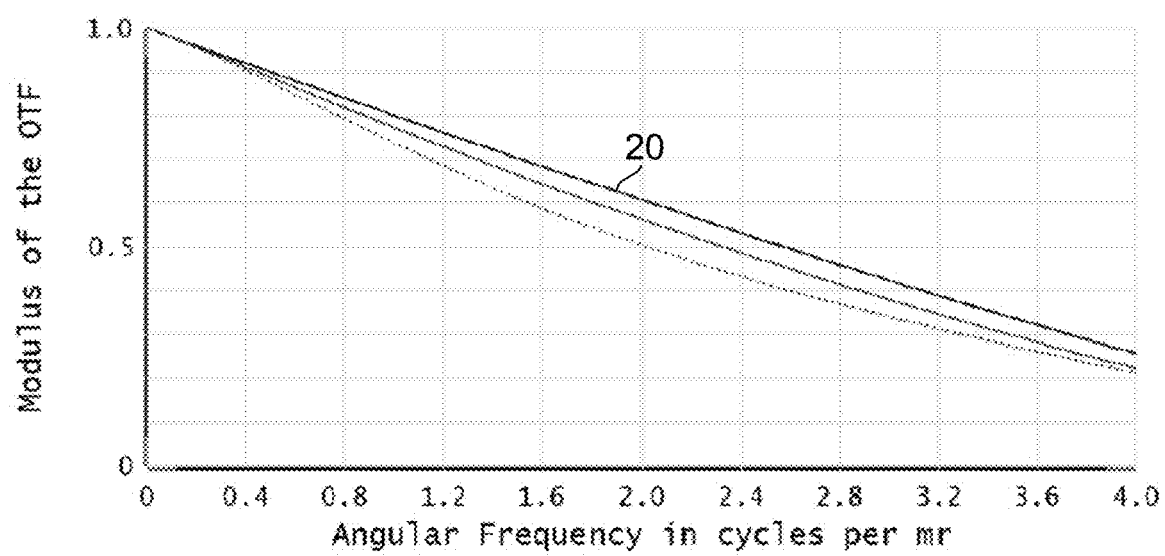
Figure 12C:
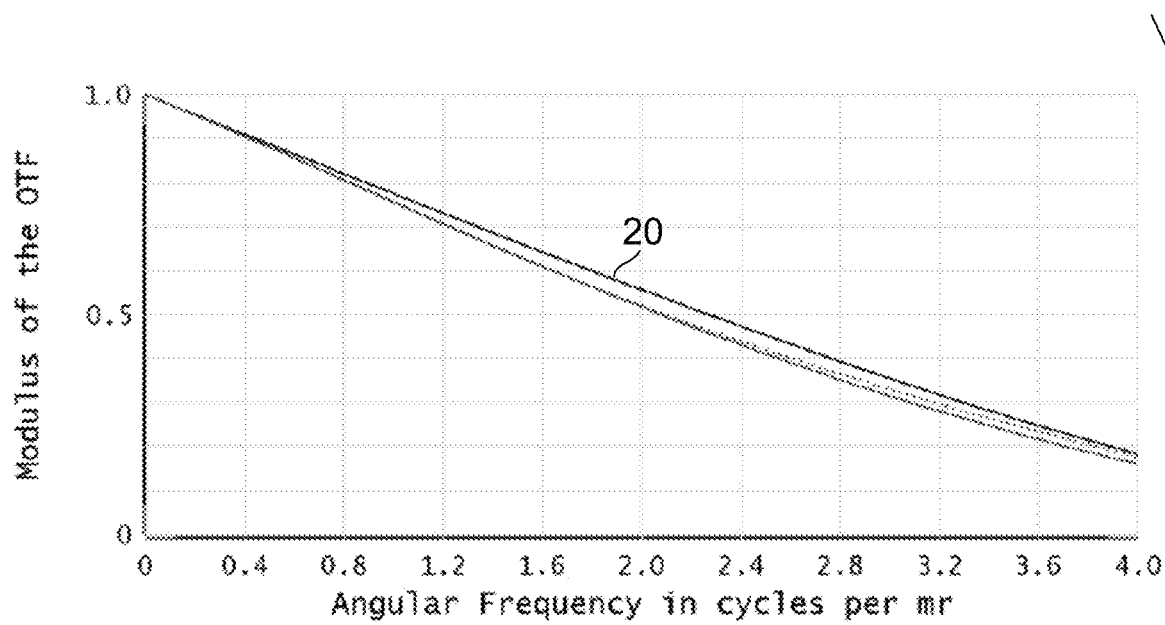
FIG. 12C is a diagram depicting the modulus of the OTF with respect to angular frequency at different field angles, depicting the lens' diffraction-limited MTF at a 4-mm aperture.
Figure 12C:
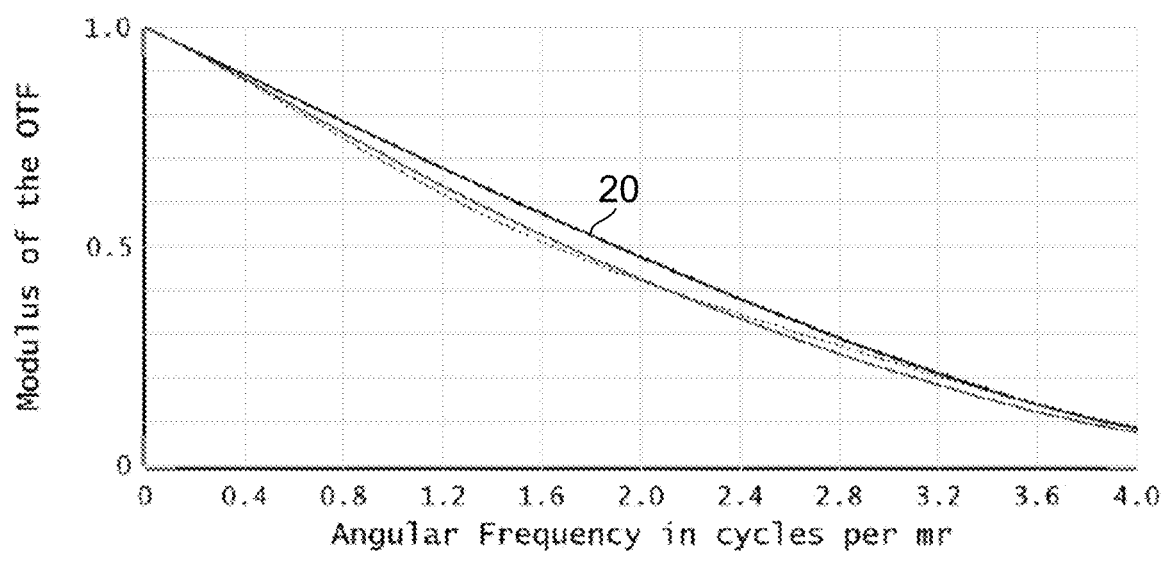
Figure 13A:
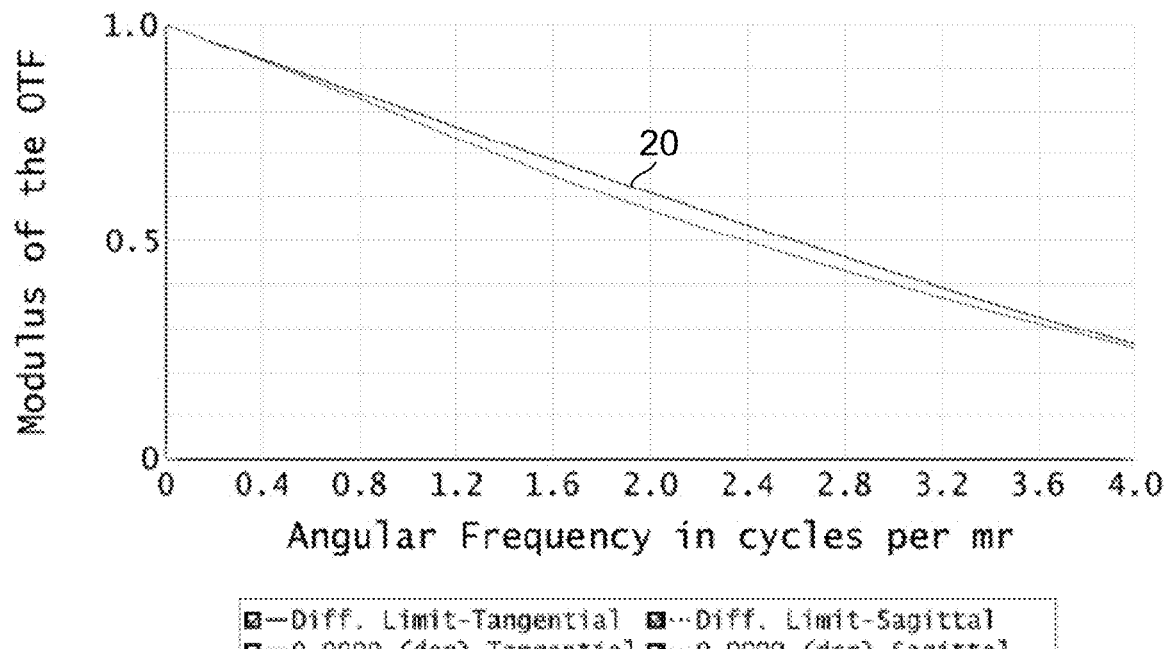
FIG. 13A is a diagram depicting the modulus of the OTF with respect to angular frequency at different field angles, depicting the lens' diffraction-limited MTF at a 3.5-mm aperture.
Figure 13A:
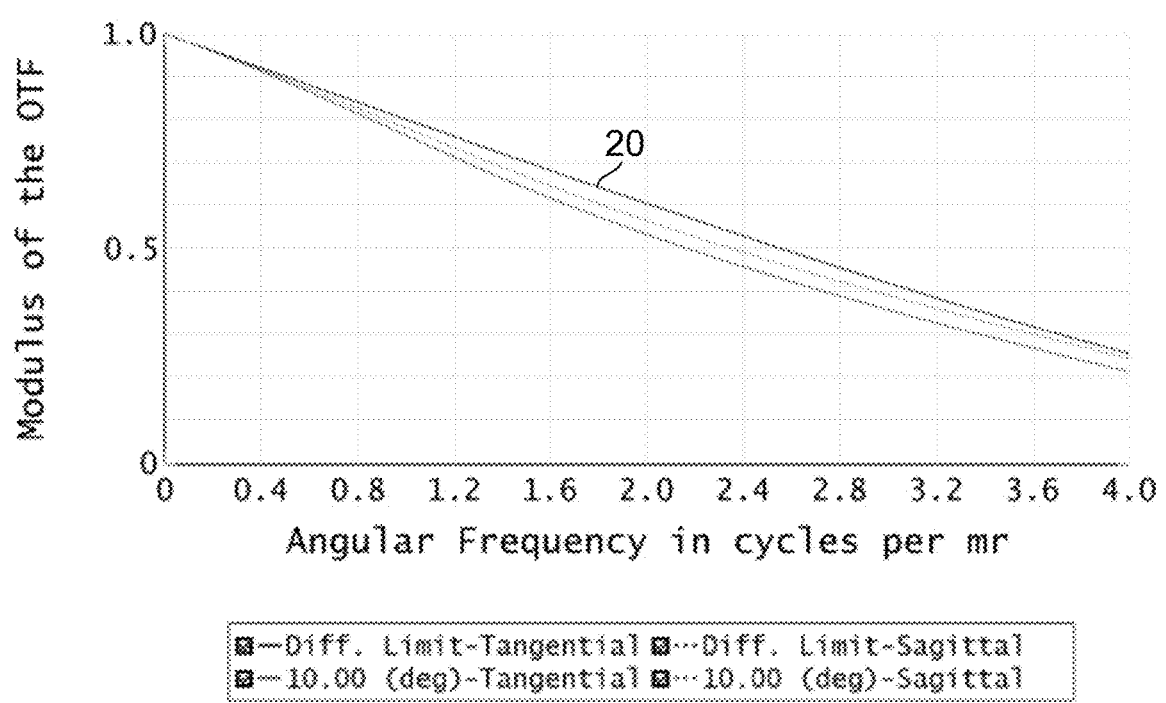
Figure 13B:
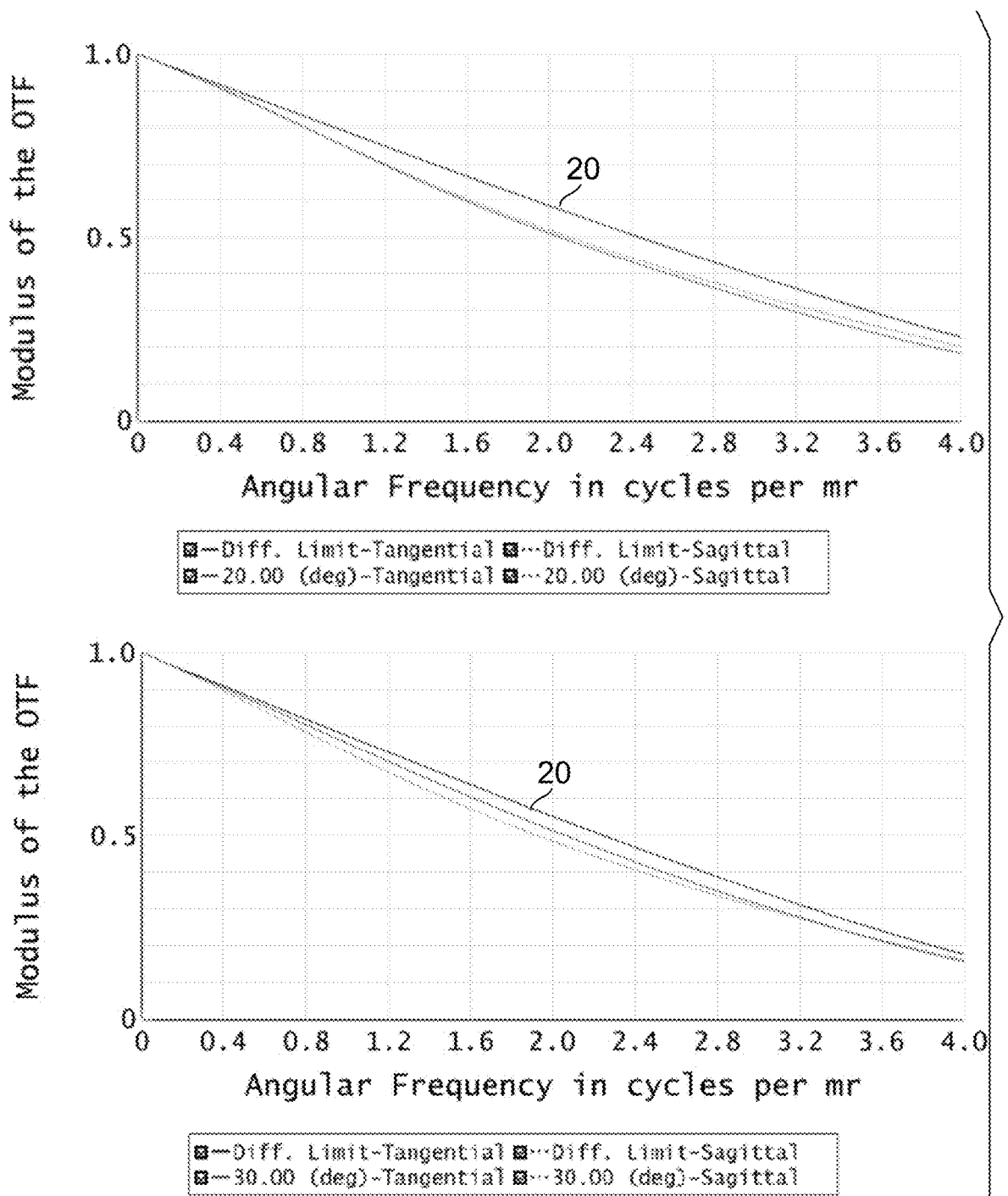
FIG. 13B is a diagram depicting the modulus of the OTF with respect to angular frequency at different field angles, depicting the lens' diffraction-limited MTF at a 3.5-mm aperture.
Figure 13C:
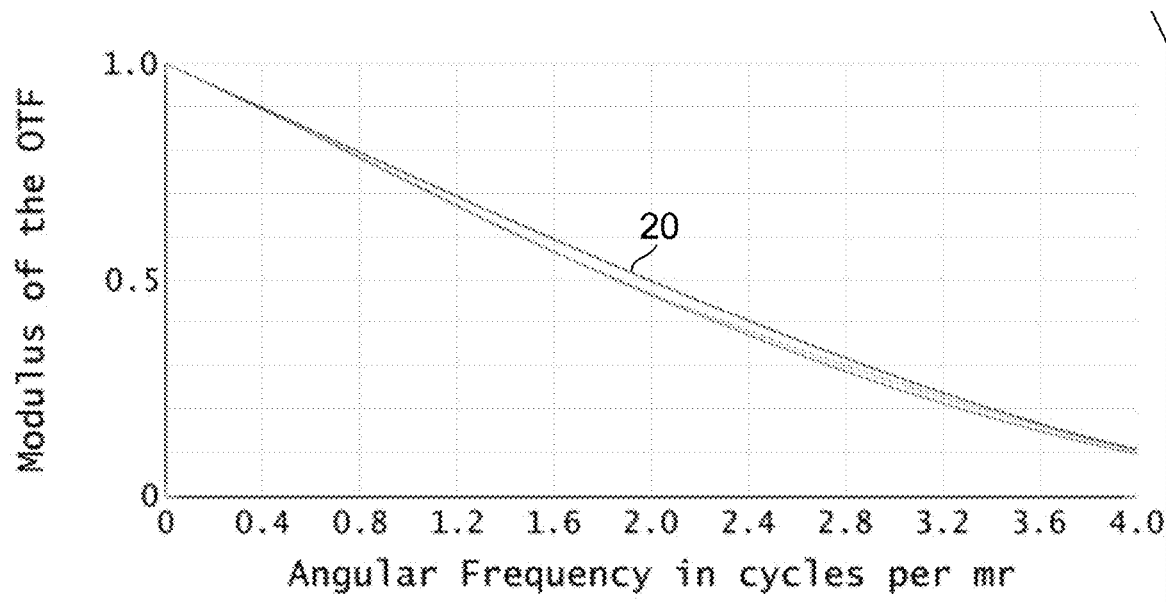
FIG. 13C is a diagram depicting the modulus of the OTF with respect to angular frequency at different field angles, depicting the lens' diffraction-limited MTF at a 3.5-mm aperture.
Figure 13C:
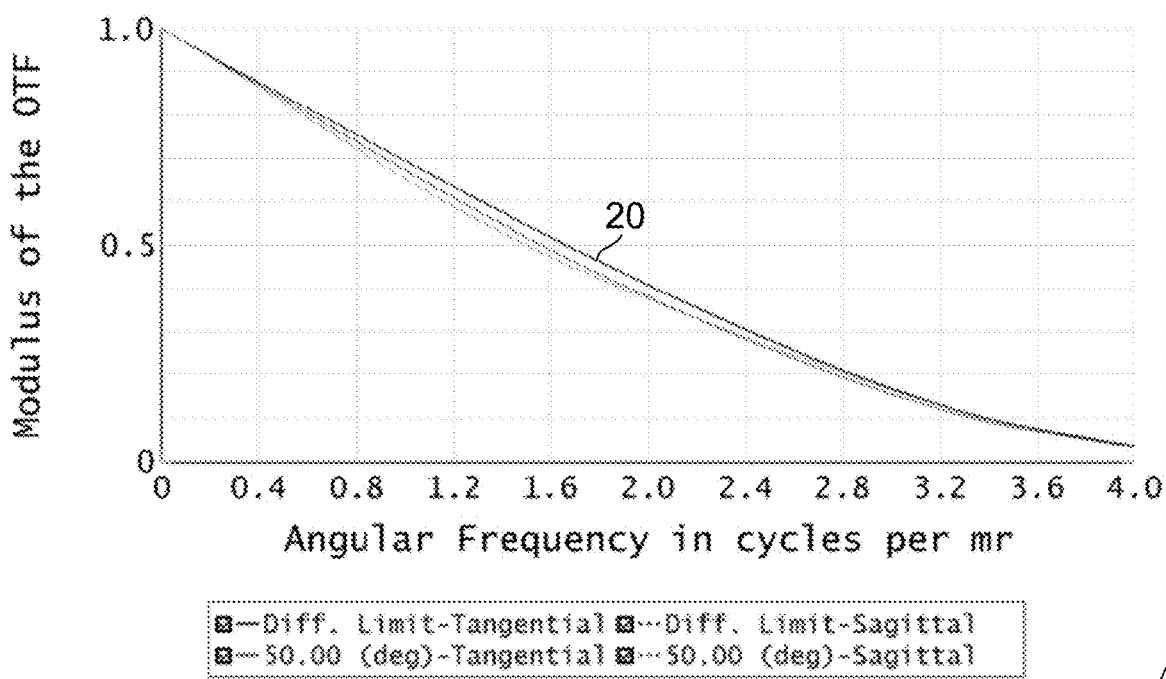
Figure 14A:
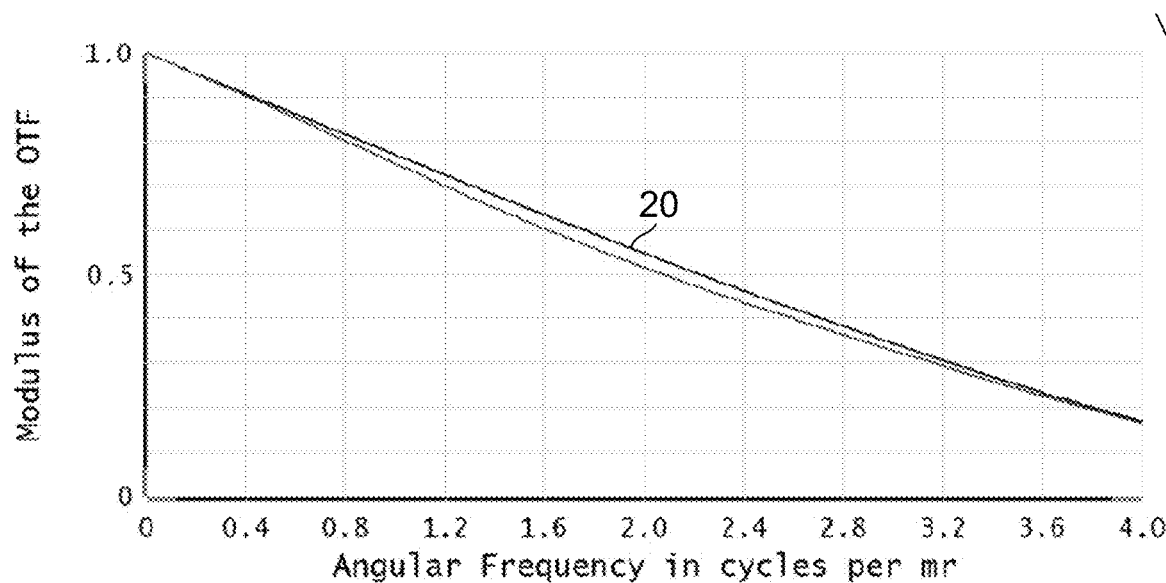
FIG. 14A is a diagram depicting the modulus of the OTF with respect to angular frequency at different field angles, depicting the lens' diffraction-limited MTF at a 3-mm aperture.
Figure 14A:
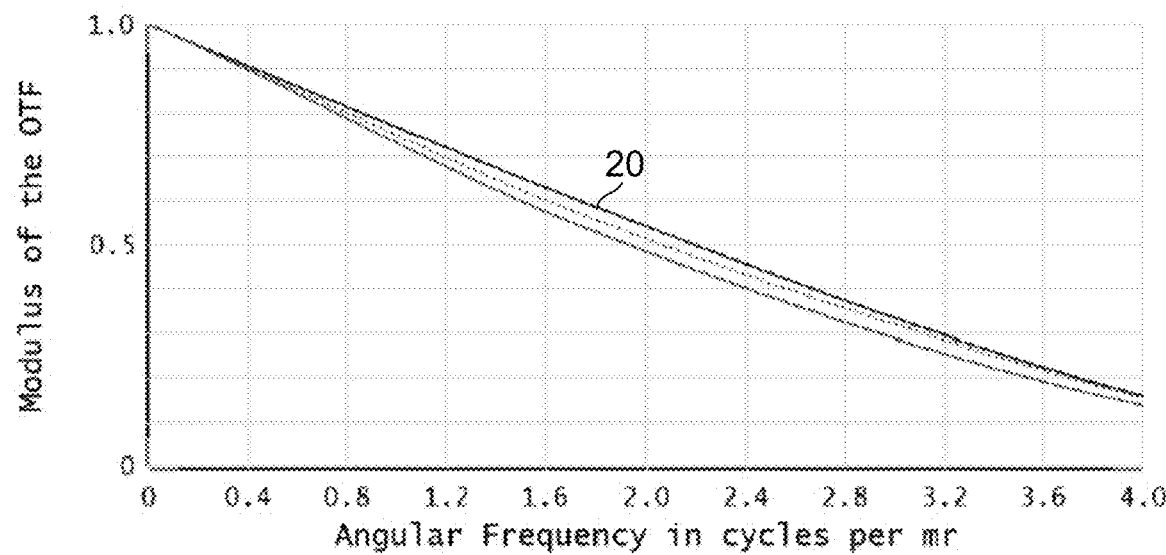
Figure 14B:
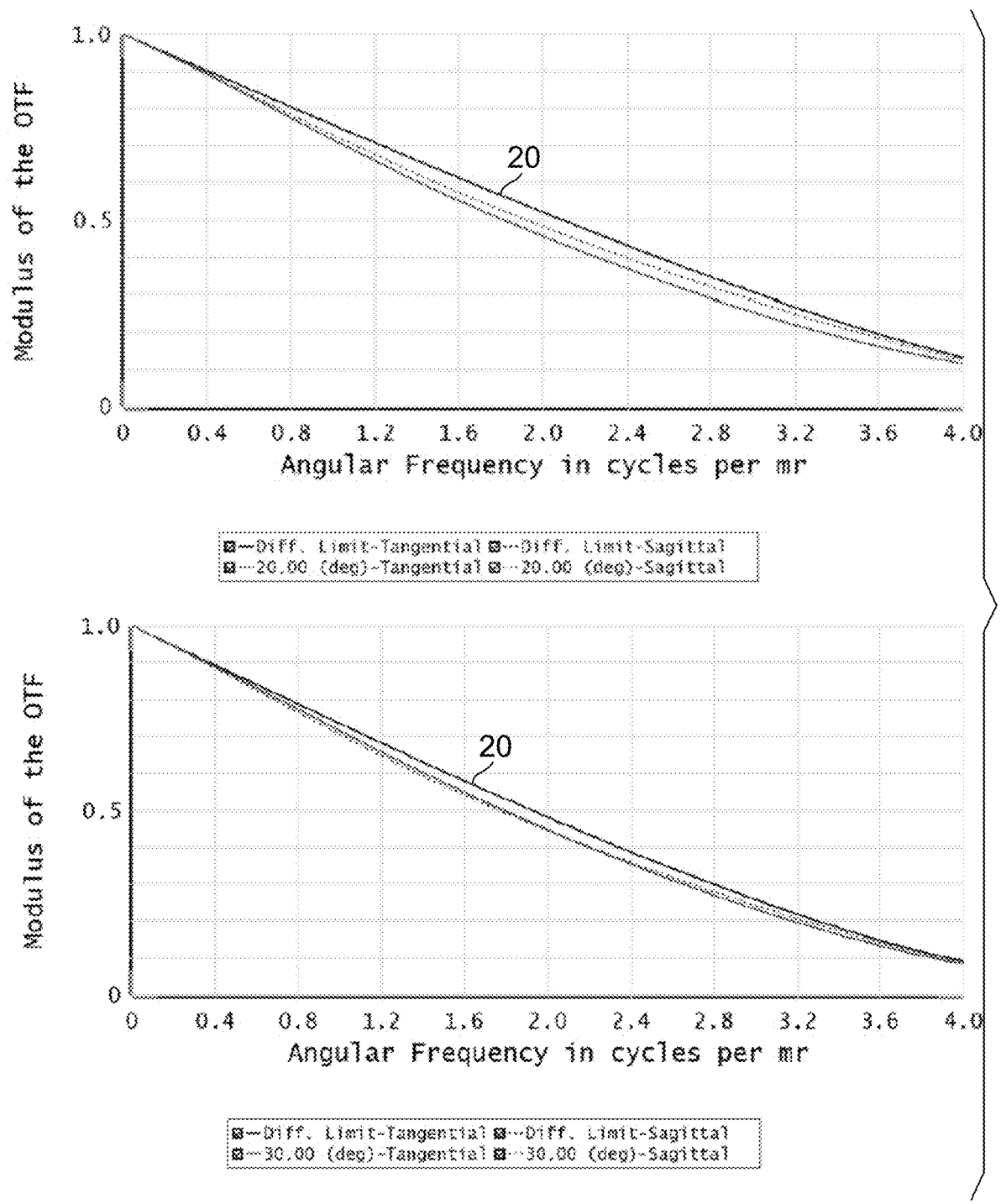
FIG. 14B is a diagram depicting the modulus of the OTF with respect to angular frequency at different field angles, depicting the lens' diffraction-limited MTF at a 3-mm aperture.
Figure 14C:
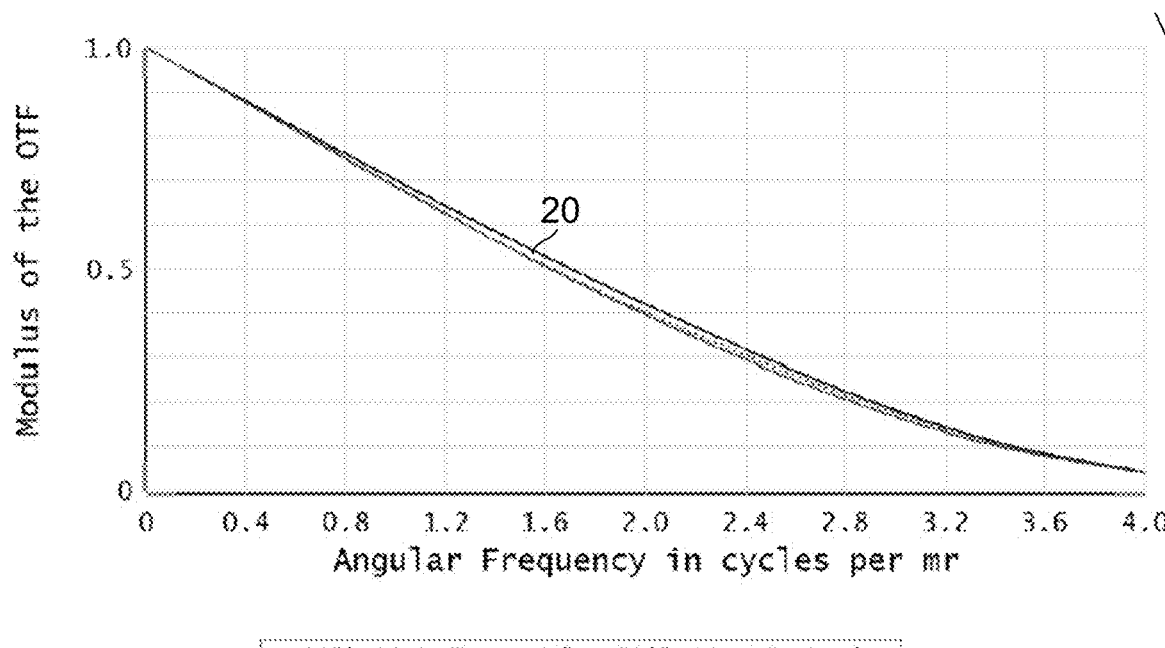
FIG. 14C is a diagram depicting the modulus of the OTF with respect to angular frequency at different field angles, depicting the lens' diffraction-limited MTF at a 3-mm aperture.
Figure 14C:
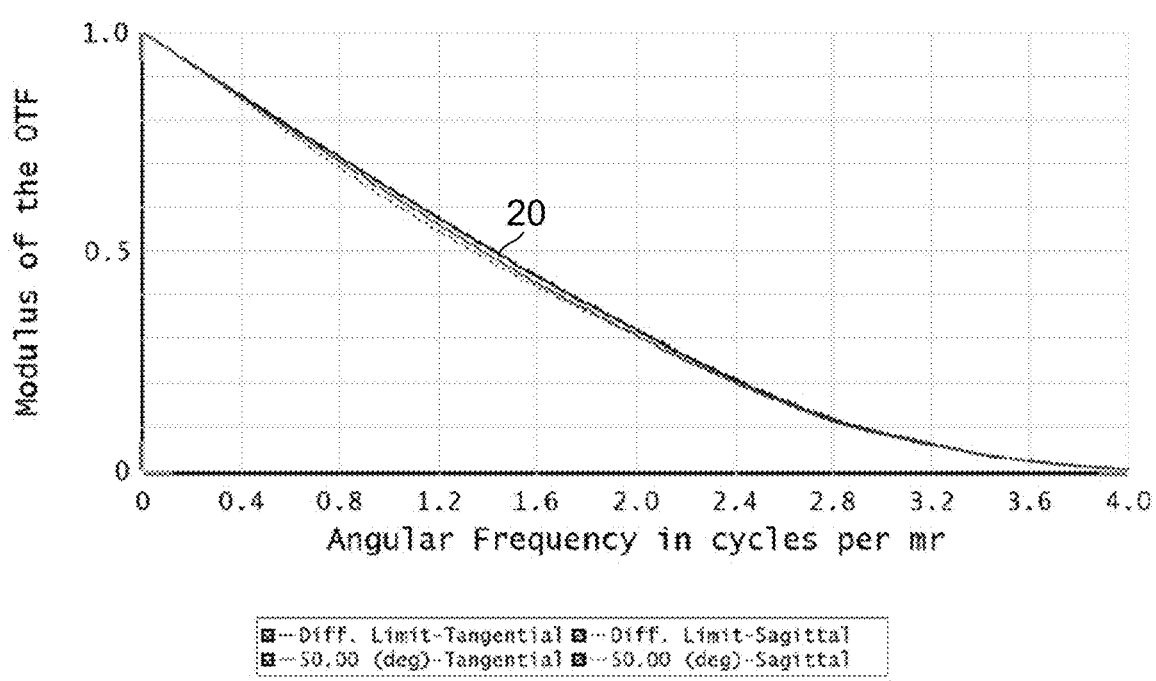
Figure 15A:
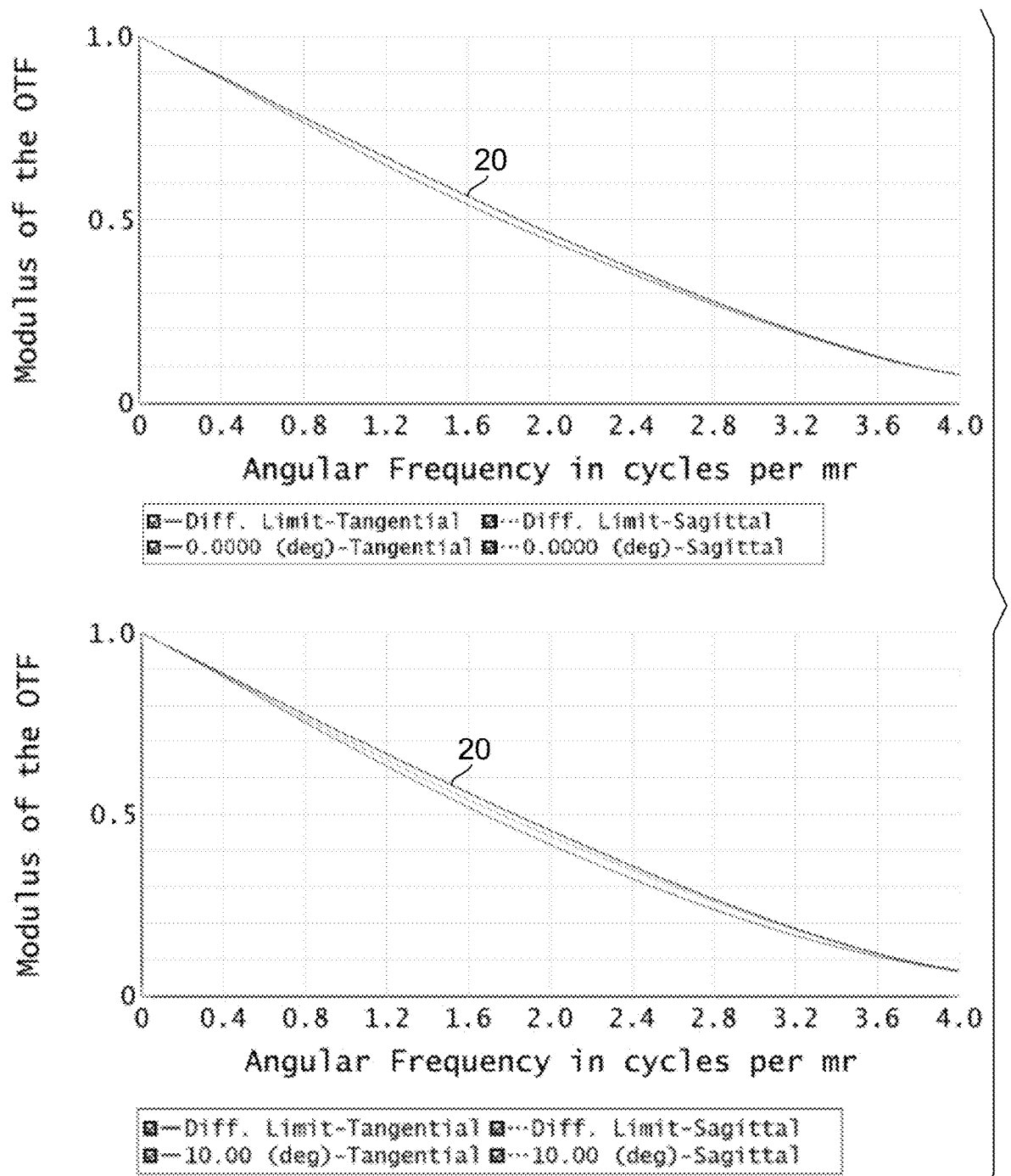
FIG. 15A is a diagram depicting the modulus of the OTF with respect to angular frequency at different field angles, depicting the lens' diffraction-limited MTF at a 2.5-mm aperture.
Figure 15B:
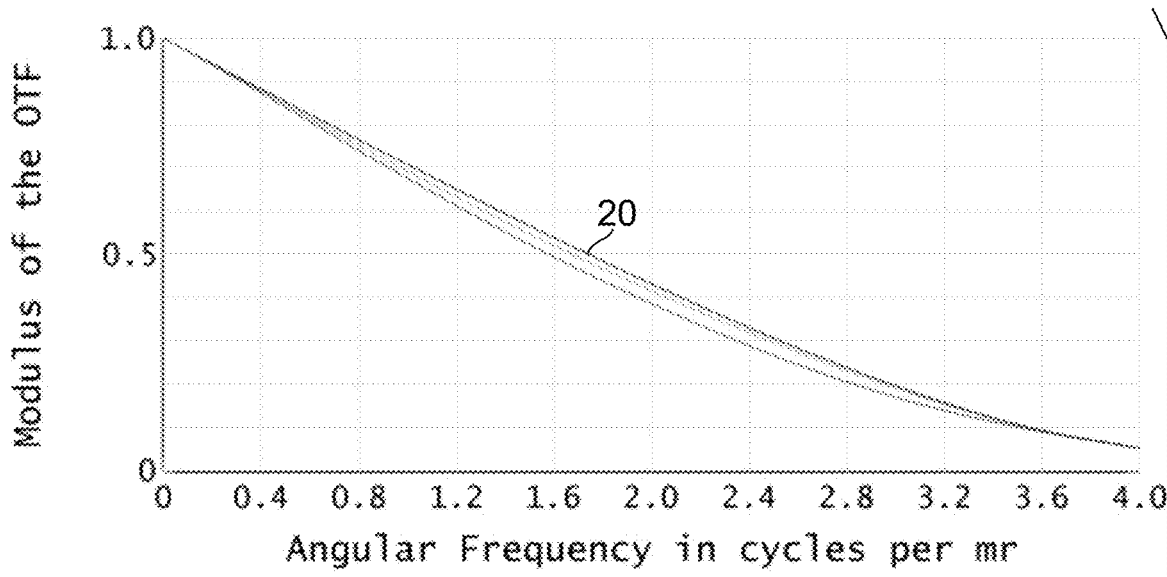
FIG. 15B is a diagram depicting the modulus of the OTF with respect to angular frequency at different field angles, depicting the lens' diffraction-limited MTF at a 2.5-mm aperture.
Figure 15B:
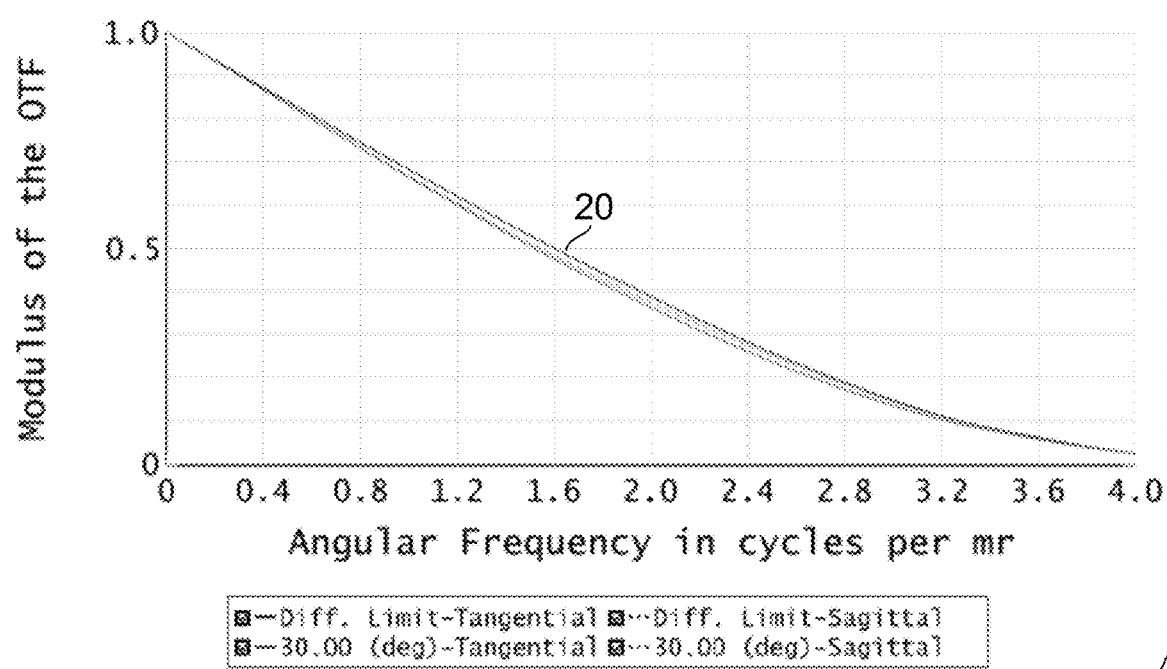
Figure 15C:
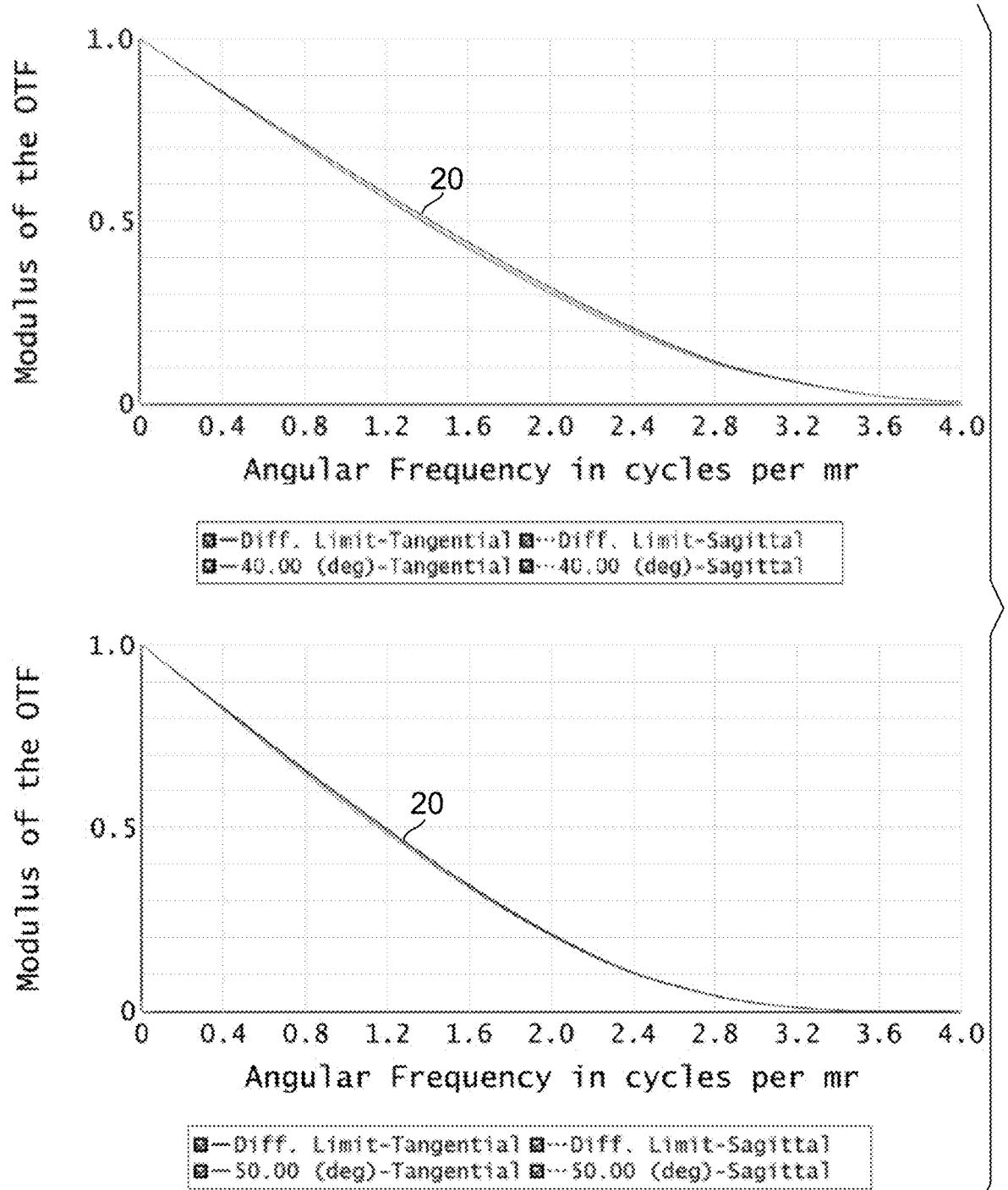
FIG. 15C is a diagram depicting the modulus of the OTF with respect to angular frequency at different field angles, depicting the lens' diffraction-limited MTF at a 2.5-mm aperture.
Figure 16A:
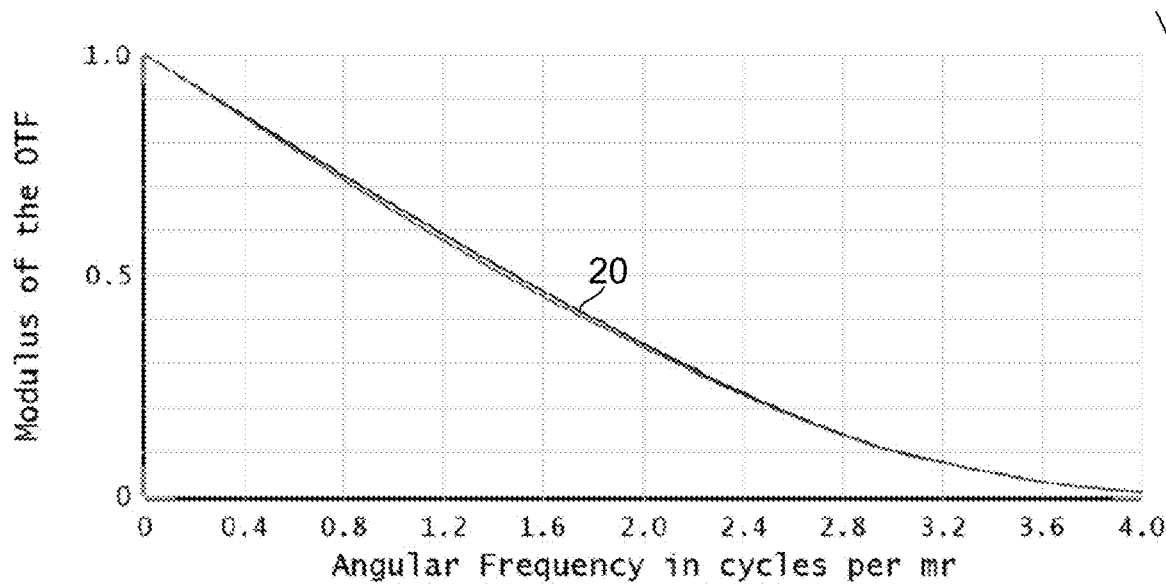
FIG. 16A is a diagram depicting the modulus of the OTF with respect to angular frequency at different field angles, depicting the lens' diffraction-limited MTF at a 2-mm aperture.
Figure 16A:
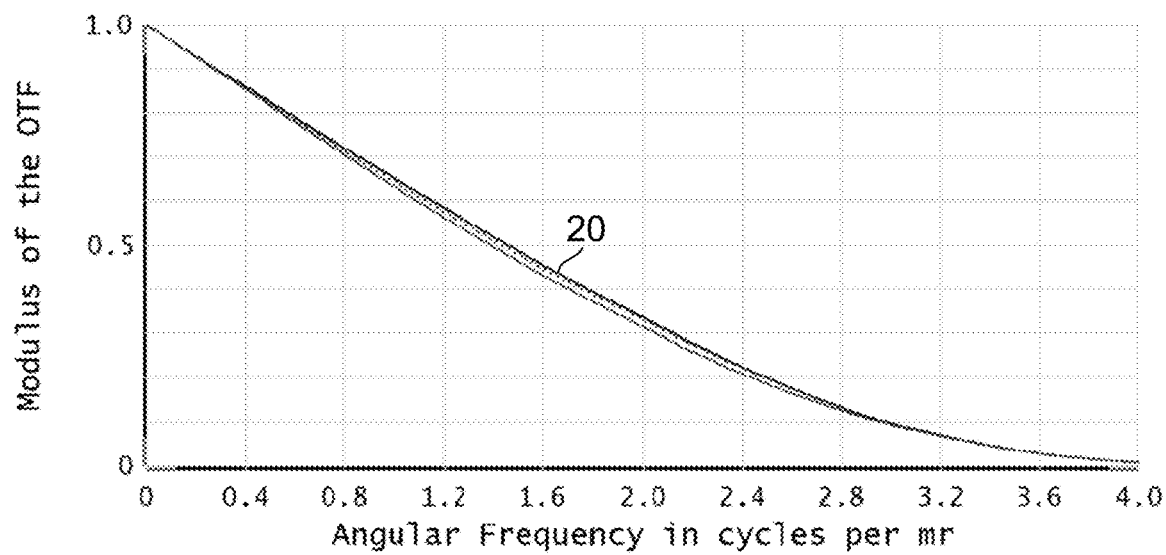
Figure 16B:
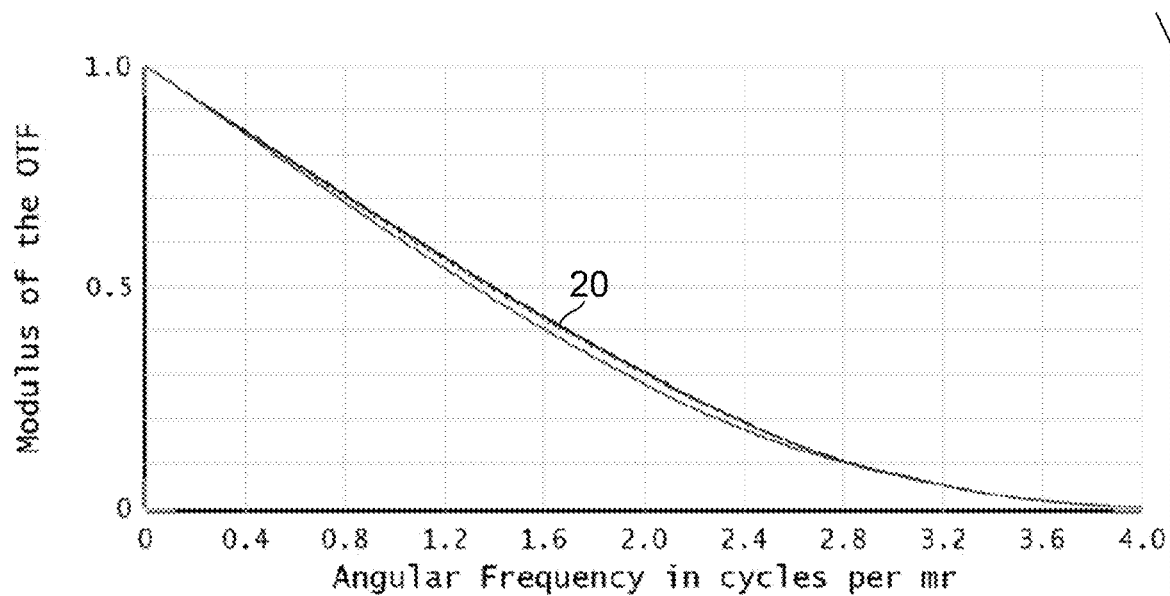
FIG. 16B is a diagram depicting the modulus of the OTF with respect to angular frequency at different field angles, depicting the lens' diffraction-limited MTF at a 2-mm aperture.
Figure 16B:
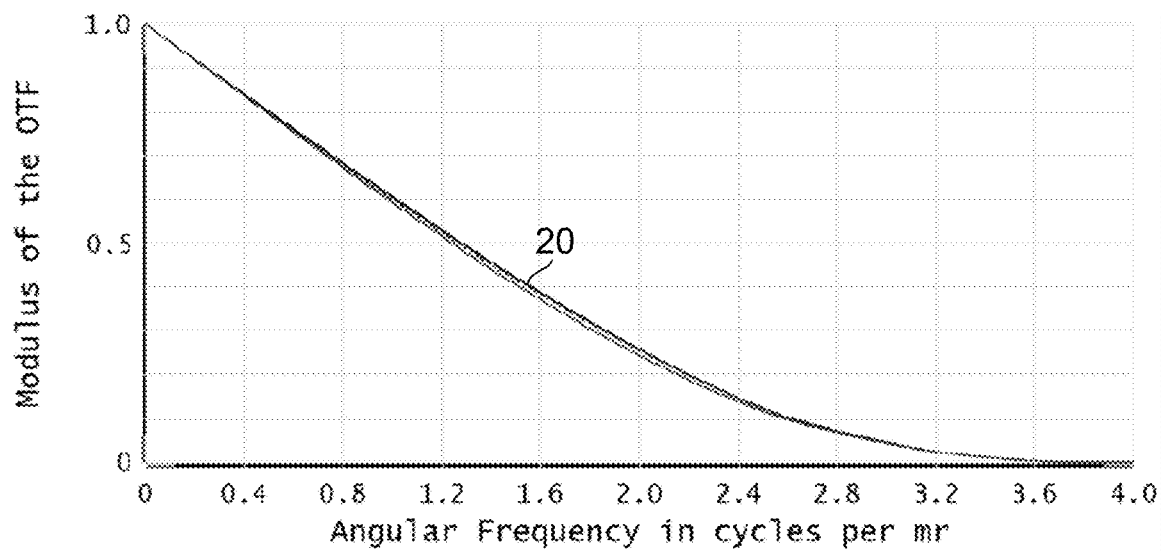
Figure 16C:
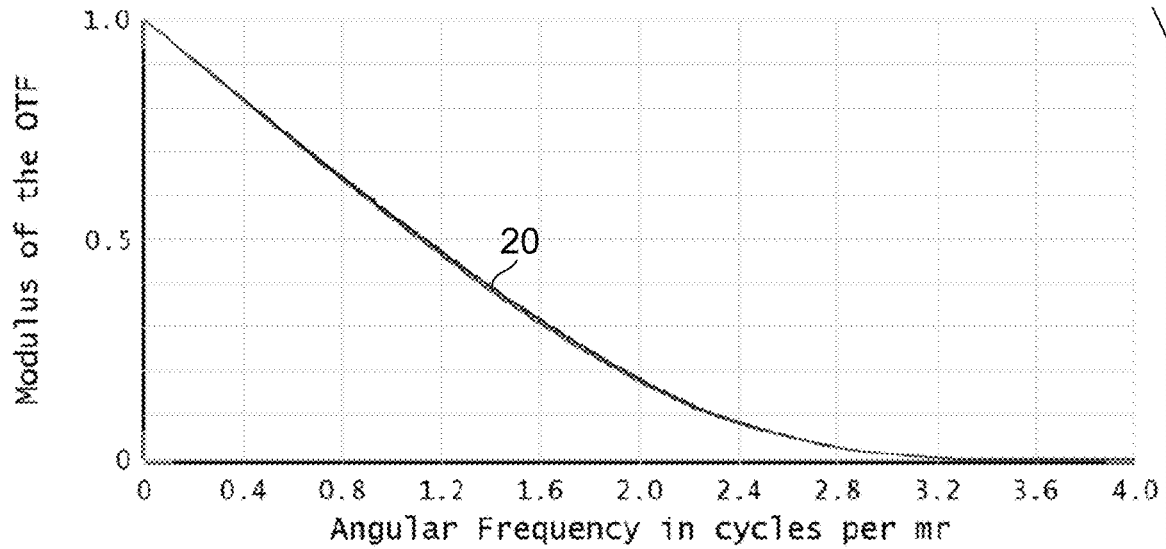
FIG. 16C is a diagram depicting the modulus of the OTF with respect to angular frequency at different field angles, depicting the lens' diffraction-limited MTF at a 2-mm aperture.
Figure 16C:
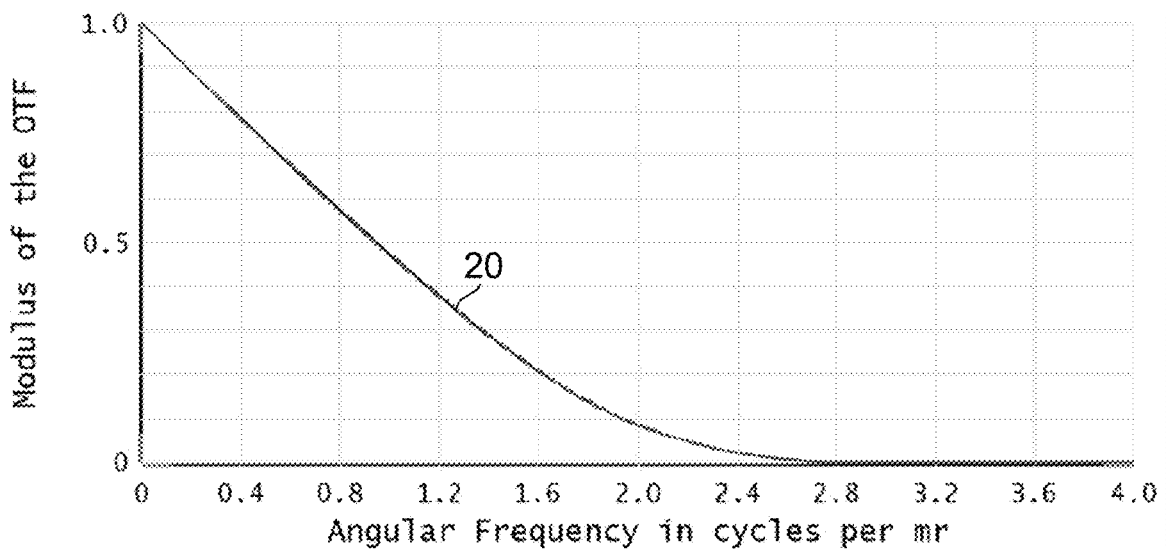

Modulation Transfer Function (MTF) units for focal systems may be expressed in cycles per millimeter or cycles per milliradian. When using cycles per millimeter, the MTF is computed for spatial frequencies in image space on the image surface. However, a pattern with a certain cycles per millimeter is imaged very differently by the lens depending on distances and thus it may cause confusion especially when the virtual distance is variable in a DUT. When expressed in cycles per milliradian, the MTF is computed for angular frequencies in object space and it is independent on the viewing distance. For XR metrology which measures devices specifically for use with human eye, the unit cycles per milliradian which specifies the resolution of the lens was found to be more suitable. For MTF measurements, the diffraction limit is slightly different among various FOVs. This is due to the lens having a very large FOV and its stop aperture is placed at the front end of the lens. As a result, the aperture size is dependent on the viewing angles. In other words, light rays from a larger field angle enter the lens through a relatively smaller aperture compared to that from a zero-degree field angle. FIGS. 12A-12C are diagrams depicting the modulus of the optical transfer function (OTF) with respect to angular frequency at different field angles, e.g., 0 and 10 degrees in FIG. 12A, 20 and 30 degrees in FIG. 12B and 40 and 50 degrees in FIG. 12C, depicting the lens' diffraction-limited modulation transfer function (MTF) at a 4-mm aperture. FIGS. 13A-13C are diagrams depicting the modulus of the OTF with respect to angular frequency at different field angles, e.g., 0 and 10 degrees in FIG. 13A, 20 and 30 degrees in FIG. 13B and 40 and 50 degrees in FIG. 13C, depicting the lens' diffraction-limited MTF at a 3.5-mm aperture. FIGS. 14A-14C are diagrams depicting the modulus of the OTF with respect to angular frequency at different field angles, e.g., 0 and 10 degrees in FIG. 14A, 20 and 30 degrees in FIG. 14B and 40 and 50 degrees in FIG. 14C, depicting the lens' diffraction-limited MTF at a 3-mm aperture. FIGS. 15A-15C are diagrams depicting the modulus of the OTF with respect to angular frequency at different field angles, e.g., 0 and 10 degrees in FIG. 15A, 20 and 30 degrees in FIG. 15B and 40 and 50 degrees in FIG. 15C, depicting the lens' diffraction-limited MTF at a 2.5-mm aperture. FIGS. 16A-16C are diagrams depicting the modulus of the OTF with respect to angular frequency at different field angles, e.g., 0 and 10 degrees in FIG. 16A, 20 and 30 degrees in FIG. 16B and 40 and 50 degrees in FIG. 16C, depicting the lens' diffraction-limited MTF at a 2-mm aperture. Referring to FIGS. 12A-16C, each set of figures A-C shows the modulus of the OTF with respect to angular frequency at field angles 0, 10, 20, 30, 40 and 50 degrees. It shall be noted, based on these figures, that the lens is well optimized with MTF performance that is close to the diffraction limit represented by line 20.

Figure 17:
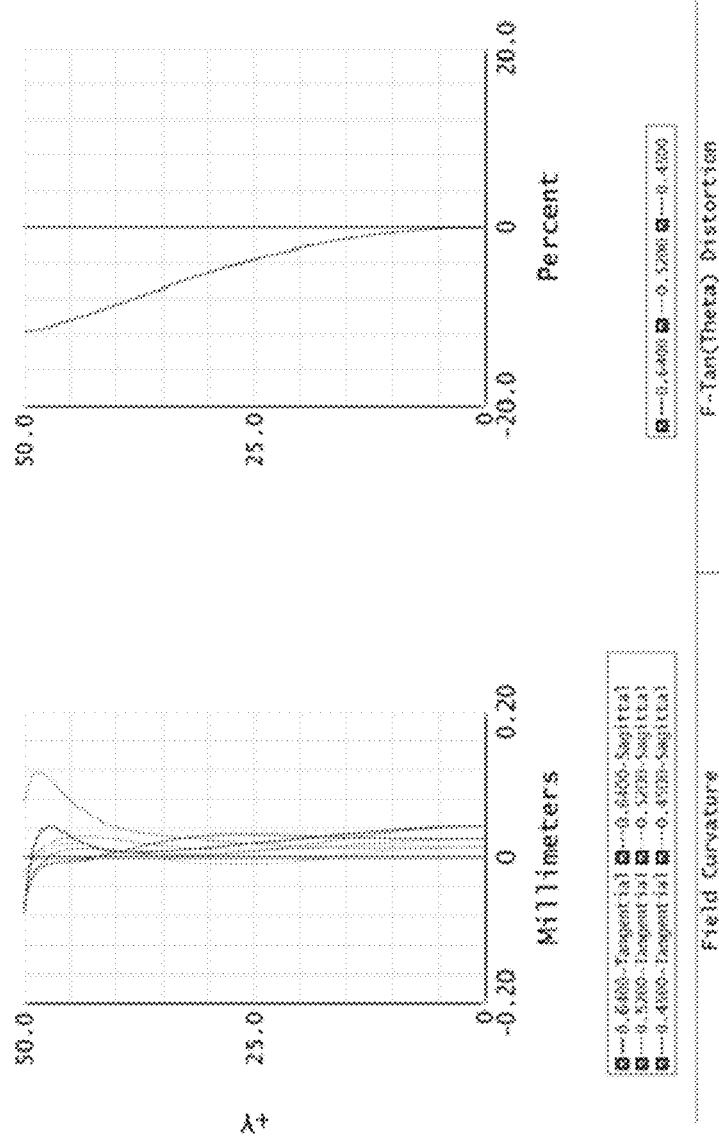
FIG. 17 is a diagram depicting the field curvature and distortion of the lens shown in FIG. 1.
Figure 18:
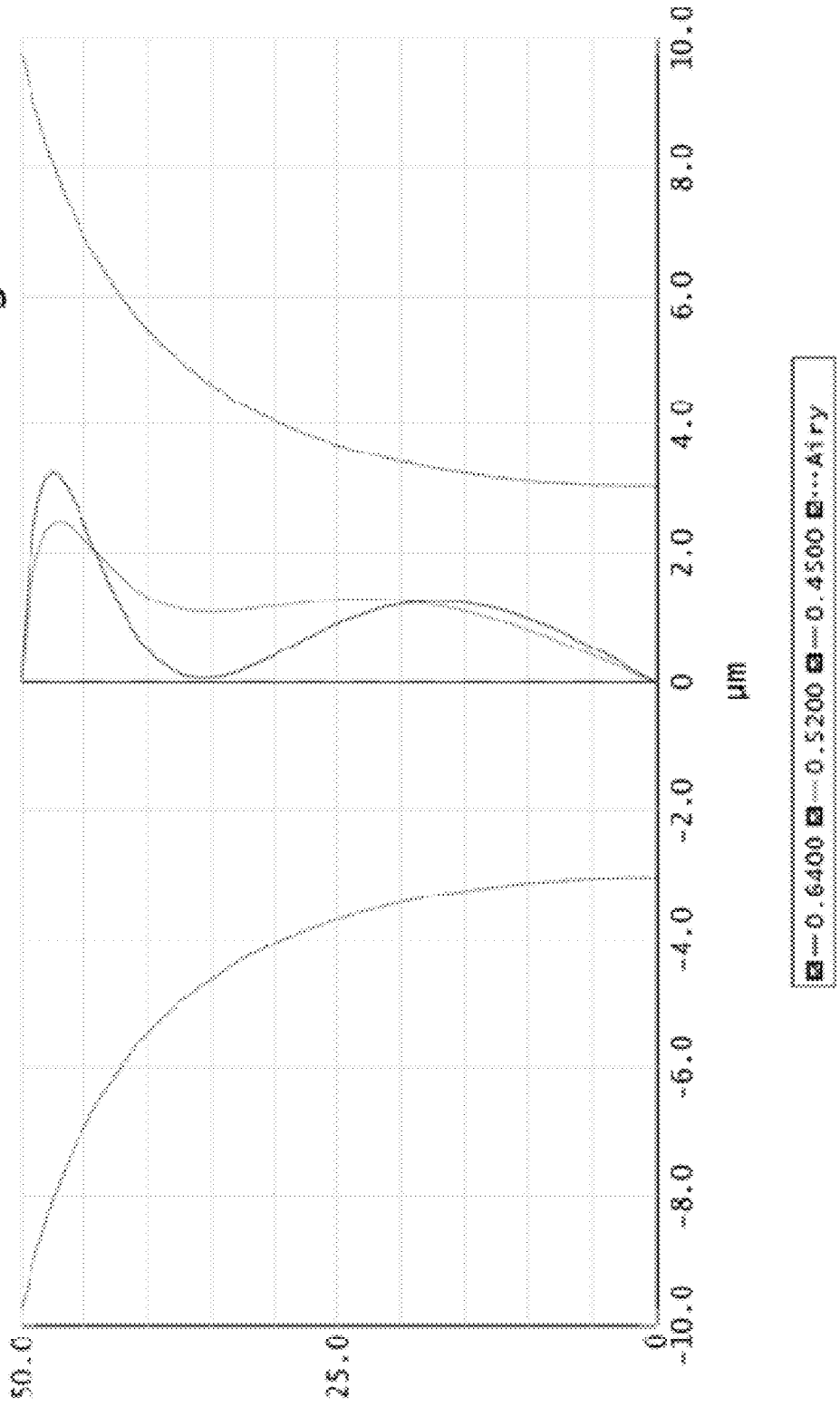
FIG. 18 is a diagram depicting the lateral color of the lens shown in FIG. 1 with a 4-mm aperture.
Figure 19:
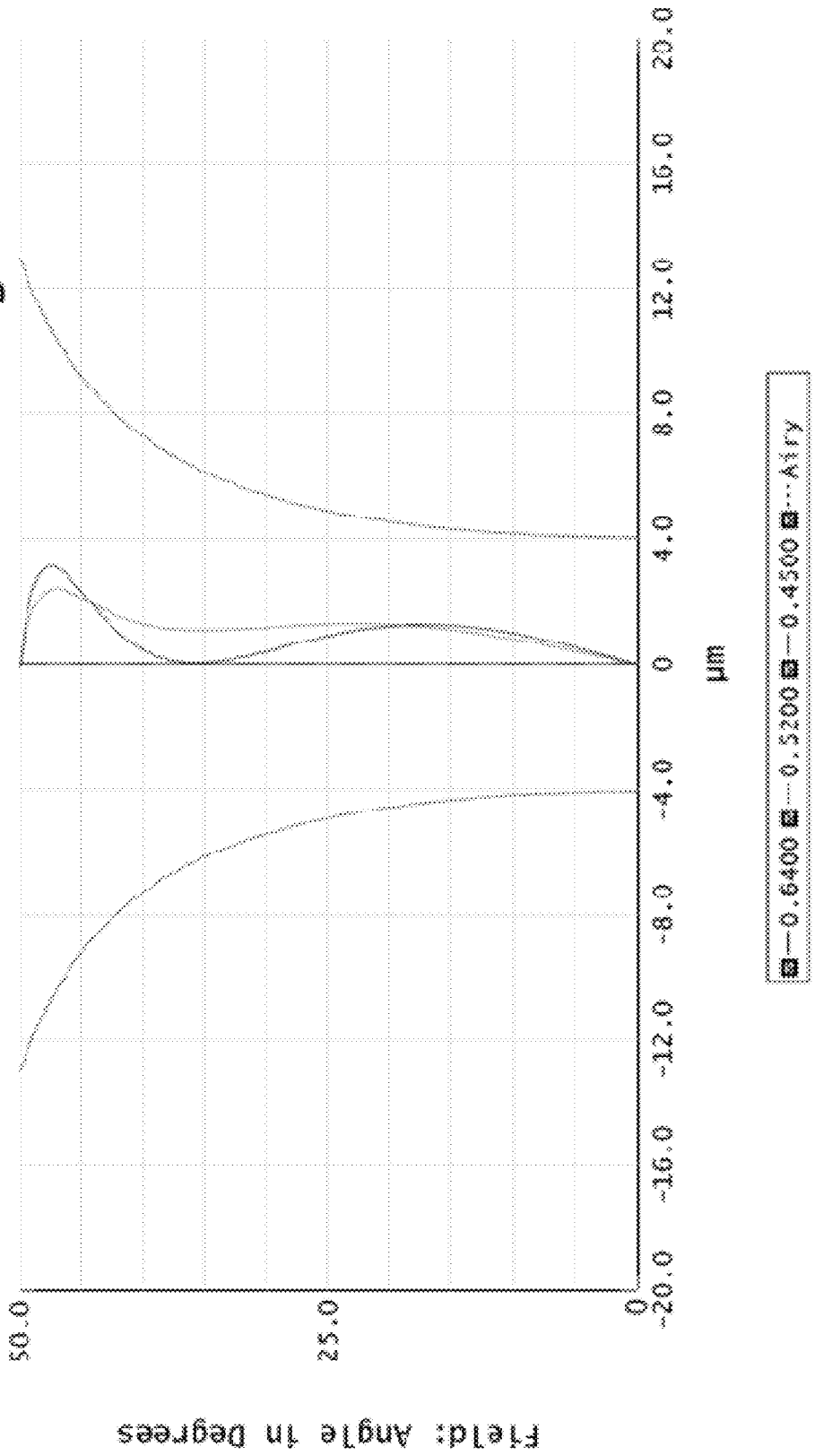
FIG. 19 is a diagram depicting the lateral color of the lens shown in FIG. 1 with a 3-mm aperture.
Figure 20:
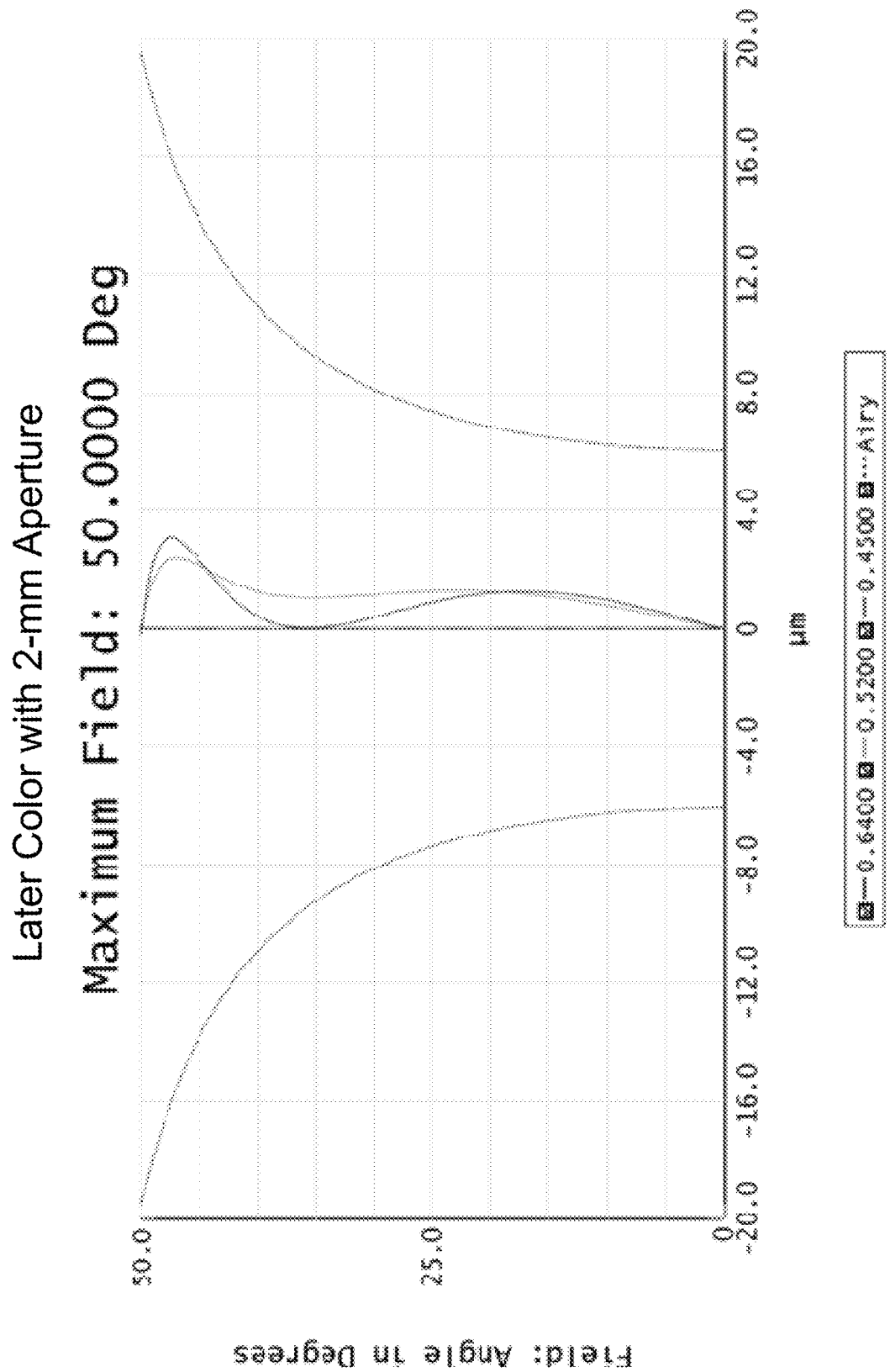
FIG. 20 is a diagram depicting the lateral color of the lens shown in FIG. 1 with a 2-mm aperture.

FIG. 17 is a diagram depicting the field curvature and a distortion of the lens shown in FIG. 1. Field curvature and distortion are the same for different apertures of about 2-4 mm. The maximum distortion is about 11.68%, which is very small for a 100-degree lens, especially when the stop of the present lens is placed at the front of the lens. FIG. 18 is a diagram depicting the lateral color of the lens shown in FIG. 1 with a 4-mm aperture. FIG. 19 is a diagram depicting the lateral color of the lens shown in FIG. 1 with a 3-mm aperture. FIG. 20 is a diagram depicting the lateral color of the lens shown in FIG. 1 with a 2-mm aperture. Lateral Color is well corrected under different apertures. The chromatic aberration is controlled within the diffraction limit (the two dish lines). Lateral color is important for colorimeter applications especially when the features of the DUT are very small, e.g., to measure the pixel colors in the XR light engines or microLED panels.

Figure 21:
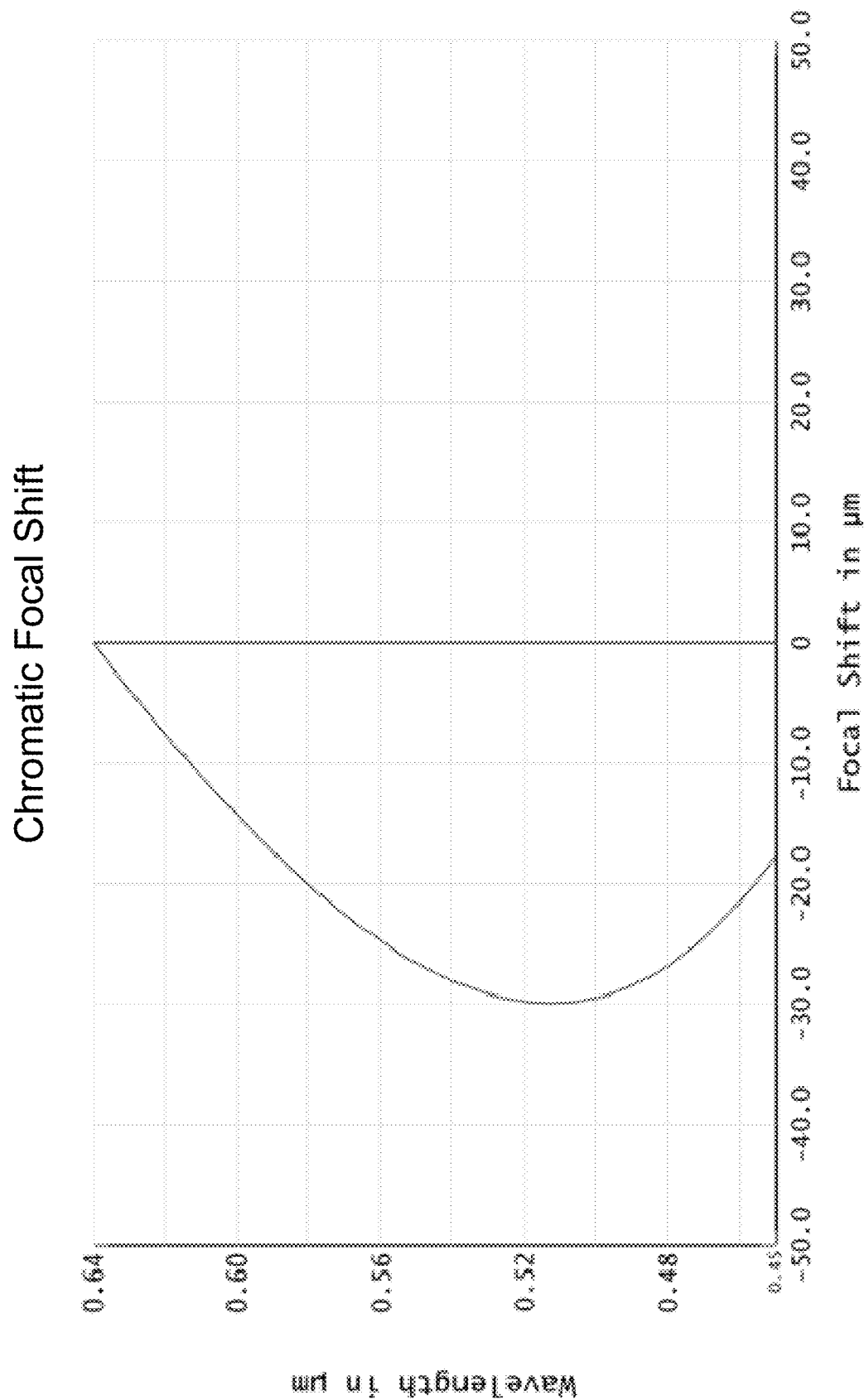
FIG. 21 is a diagram depicting a chromatic focal shift of the present lens with an aperture of 2-4 mm.

FIG. 21 is a diagram depicting a chromatic focal shift of the present lens with an aperture diameter of 2-4 mm. The focal shift is the same for different apertures of from about 2 mm to about 4 mm in diameter. The maximum focal shift range is about 30 um. The chromatic focal shift should not be a concern as the lens has a relatively large depth of focus of over about 40 um. Also, the measurements are normally conducted with single RGB colors in the XR metrology, especially for MTF-related measurements.

Figure 22A:
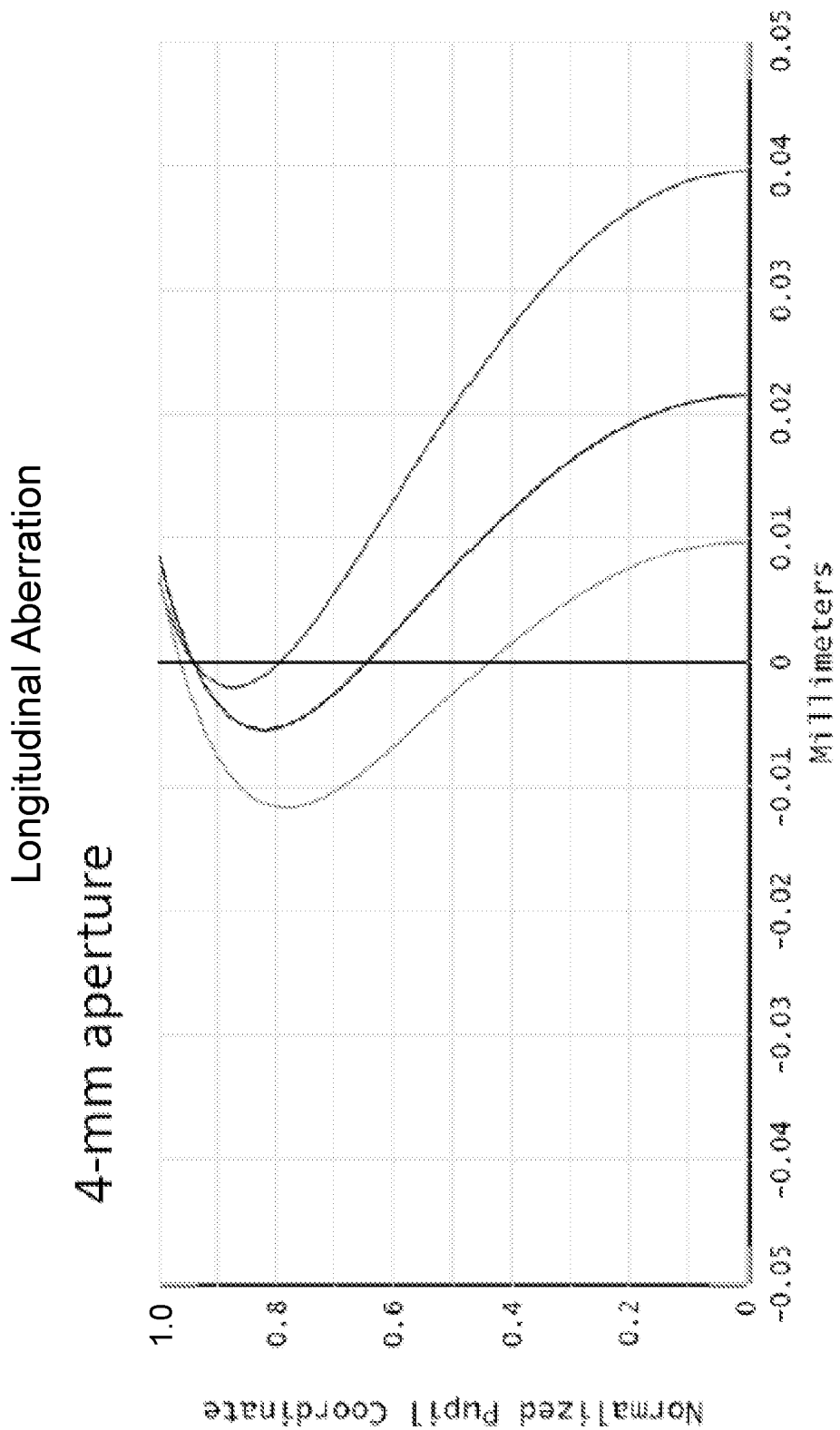
FIG. 22A is a diagram depicting longitudinal aberrations for an aperture of 4 mm.
Figure 22B:
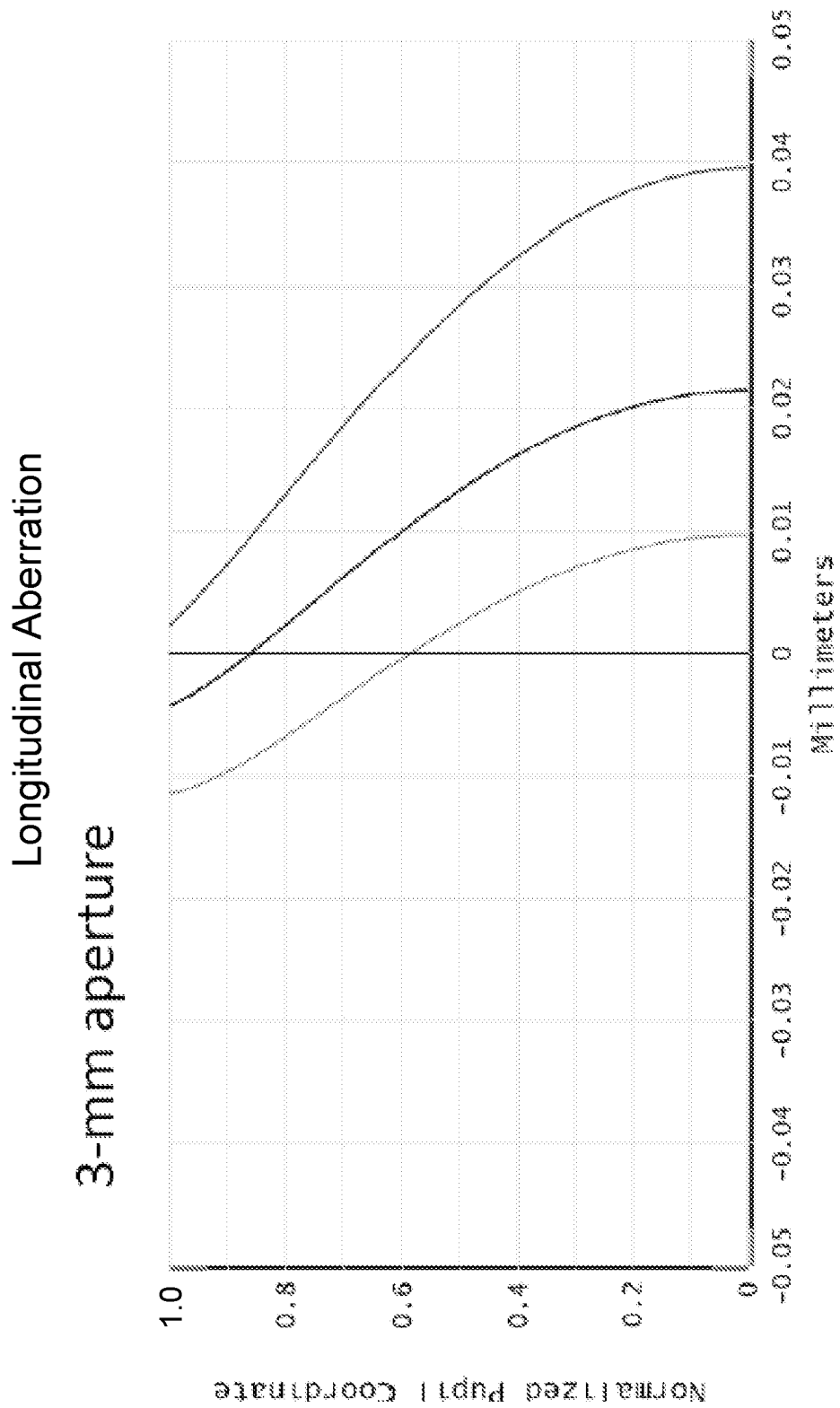
FIG. 22B is a diagram depicting longitudinal aberrations for an aperture of 3 mm.
Figure 22C:
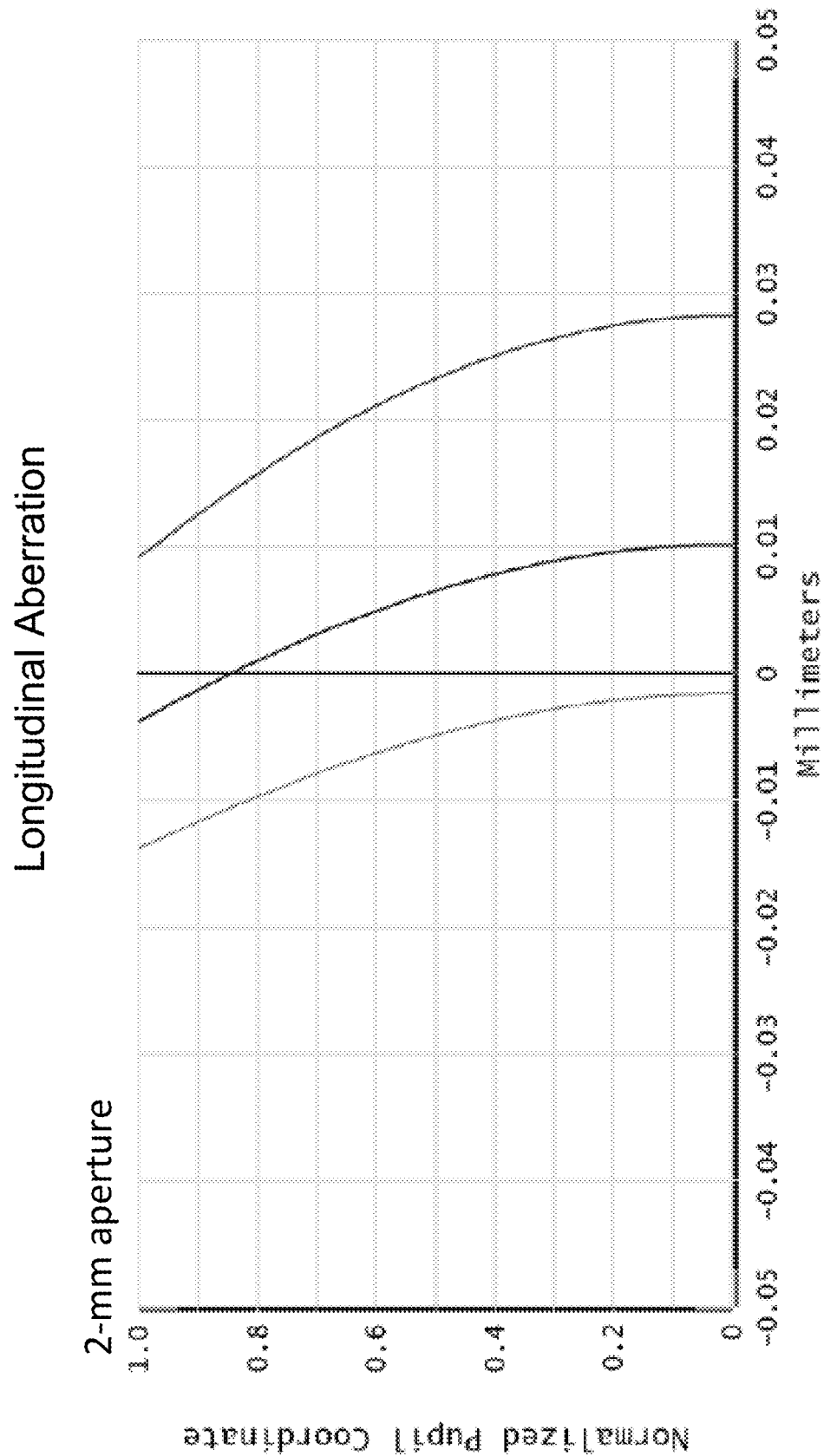
FIG. 22C is a diagram depicting longitudinal aberrations for an aperture of 2 mm.

FIG. 22A is a diagram depicting longitudinal aberrations for an aperture of 4 mm. FIG. 22B is a diagram depicting longitudinal aberrations for an aperture of 3 mm. FIG. 22C is a diagram depicting longitudinal aberrations for an aperture of 2 mm. The longitudinal aberration is relatively small compared to the depth of focus. Also, in most scenarios, the measurements are conducted with single R/G/B light.

Figure 23A:
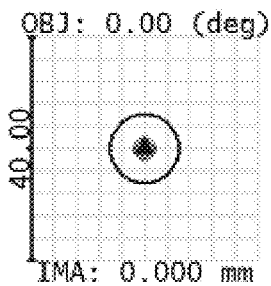
FIG. 23A are spot diagrams depicting the suitability of the present lens to be used to conduct measurements under virtual distances (VD) of 1 m and 2 m.
Figure 23A:
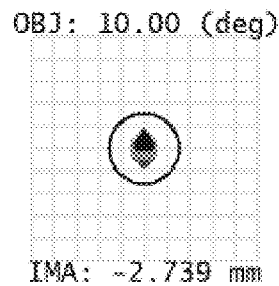
Figure 23A:
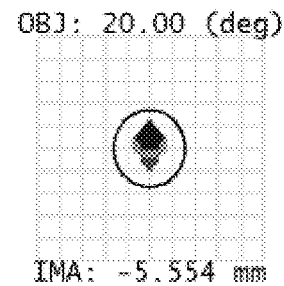
Figure 23A:
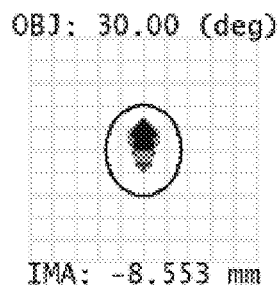
Figure 23A:
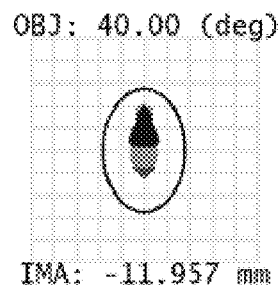
Figure 23A:
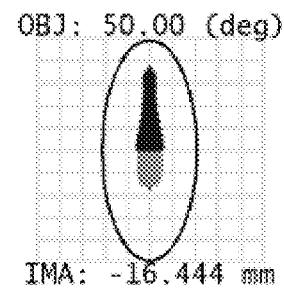
Figure 23A:
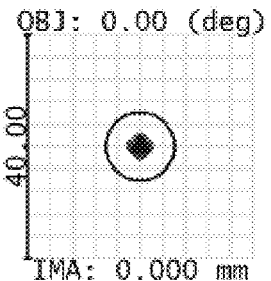
Figure 23A:
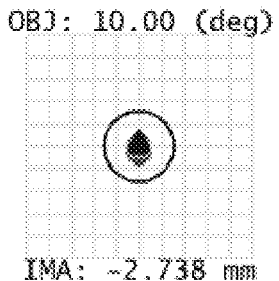
Figure 23A:
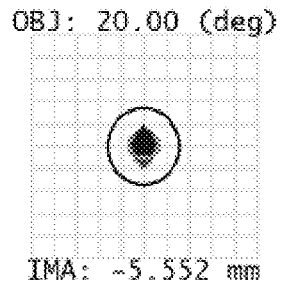
Figure 23A:
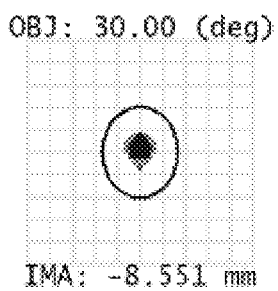
Figure 23A:
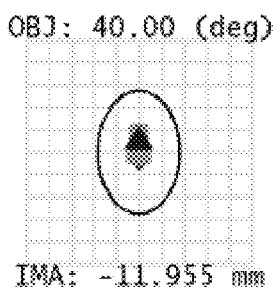
Figure 23A:
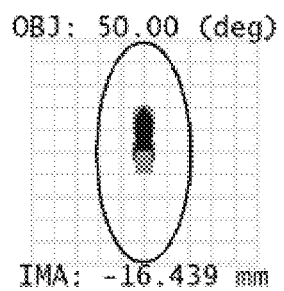
Figure 23B:
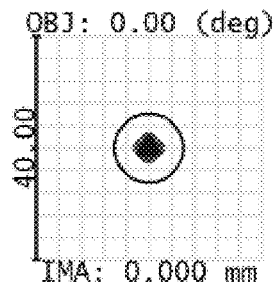
FIG. 23B are spot diagrams depicting the suitability of the present lens to be used to conduct measurements under virtual distances (VD) of 5 m and infinity.
Figure 23B:
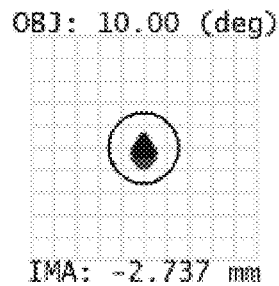
Figure 23B:
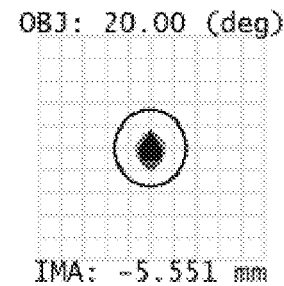
Figure 23B:
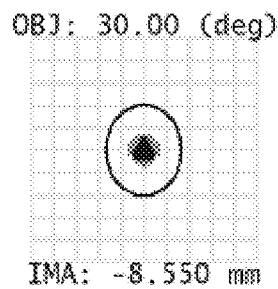
Figure 23B:
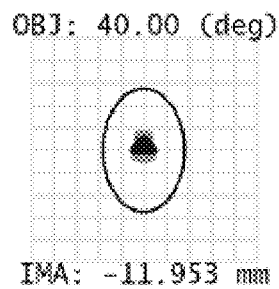
Figure 23B:
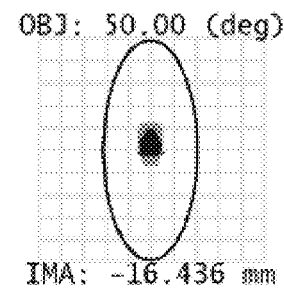
Figure 23B:
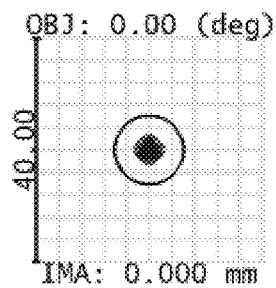
Figure 23B:
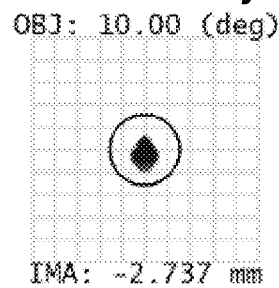
Figure 23B:
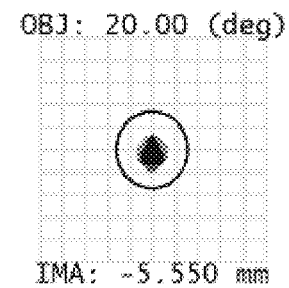
Figure 23B:
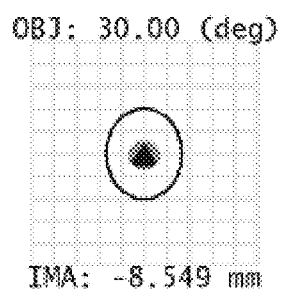
Figure 23B:
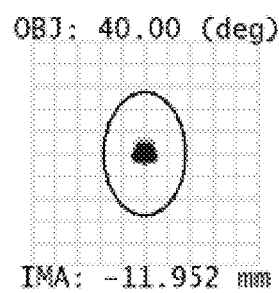
Figure 23B:
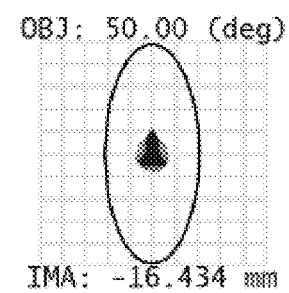
Figure 23C:
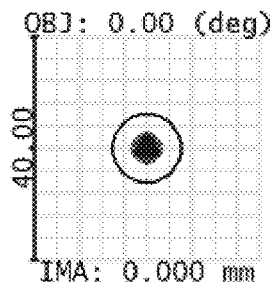
FIG. 23C are spot diagrams depicting the suitability of the present lens to be used to conduct measurements under virtual distances (VD) of −2 m and −1 m.
Figure 23C:
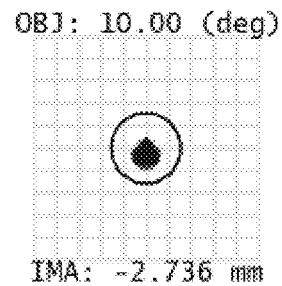
Figure 23C:
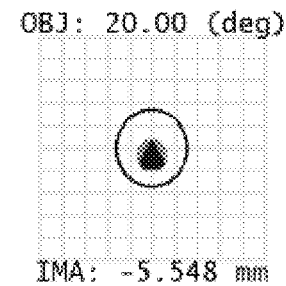
Figure 23C:
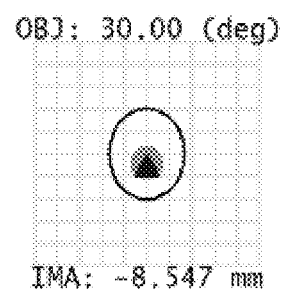
Figure 23C:
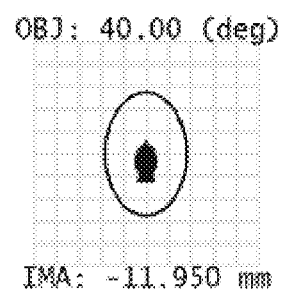
Figure 23C:
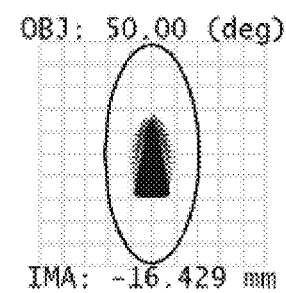
Figure 23C:
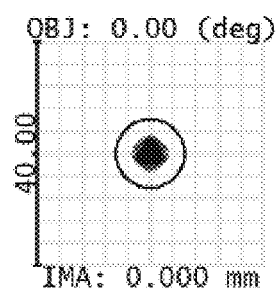
Figure 23C:
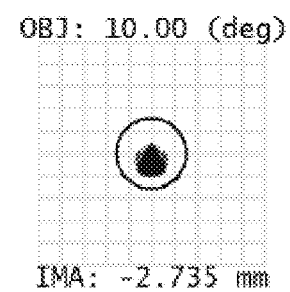
Figure 23C:
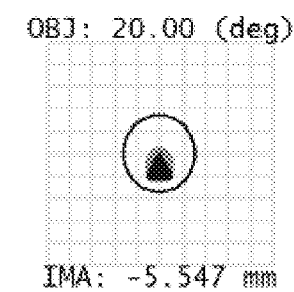
Figure 23C:
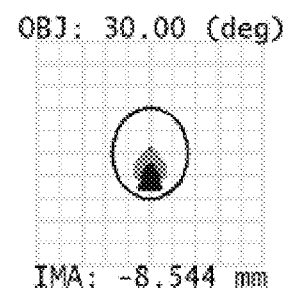
Figure 23C:
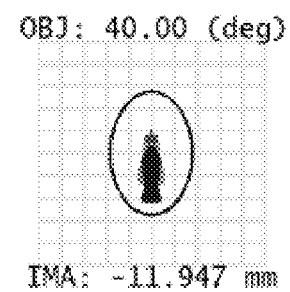
Figure 23C:
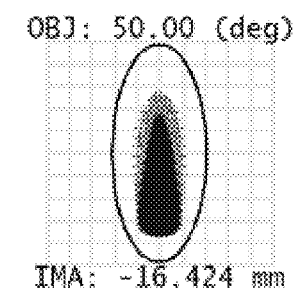

FIGS. 23A-23C are spot diagrams depicting the suitability of the present lens to be used to conduct measurements under different virtual distances (VD), i.e., a feature that is critical for XR metrology. The lens has a diffraction-limited performance from 0 D to +/−2 D depending on the aperture. For a 2-mm aperture, the lens performance is near diffraction limit from 0 D to +/−2 D. For a 3-mm aperture, the lens performance is near diffraction limit from 0 D to +/−1 D. For a 4-mm aperture, the lens performance is near diffraction limit from 0 D to +/−0.5 D The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:
1. A lens comprising:
(a) a first lens group comprising three positive singlets and an achromatic doublet for collecting all field rays received at said first lens group while making initial corrections of spherical and color aberrations;

(b) a second lens group comprising a near-symmetrical group comprising two positive meniscus elements and two negative meniscus elements, wherein said second lens group is configured to correct distortions;

(c) a third lens group comprising two positive lenses with an air gap disposed between said two positive lenses, wherein said third lens group is configured to correct field curvature and astigmatism; and (d) a fourth lens group comprising a triplet and a positive meniscus element, wherein said fourth lens group is configured to correct spherical, coma, axial color and lateral color aberrations, wherein said lens is disposed in an order of said first lens group, said second lens group, said third lens group and said fourth lens group.

2. The lens of claim 1, wherein one of said two positive lenses of said third lens group comprises an Abbe number of greater than about 50-55.

3. The lens of claim 1, wherein one of said two positive lenses of said third lens group comprises an Abbe number of less than about 50-55.

4. The lens of claim 1, further comprising an entrance pupil of a diameter of about 2-4 mm and disposed at least about 10 mm from one end of said first lens group.

5. The lens of claim 1, wherein said three positive singlets comprise two positive meniscus lenses and one biconvex lens.

6. The lens of claim 1, further comprising a neutral density (ND) filter disposed between said fourth lens group and an image plane upon which light rays through said lens are cast.

7. The lens of claim 1, further comprising an XYZ filter disposed between said fourth lens group and an image plane upon which light rays through said lens are cast.

8. The lens of claim 1, further comprising a switchable mirror disposed between said fourth lens group and an image plane upon which light rays through said lens are cast.

9. The lens of claim 1, further comprising a beam splitter disposed between said fourth lens group and an image plane upon which light rays through said lens are cast.

10. The lens of claim 1, further comprising one or more optical fibers disposed between said fourth lens group and an image plane upon which light rays through said lens are cast.

11. The lens of claim 1, further comprising a back focal length of at least about 85 mm.

12. The lens of claim 1, wherein said lens is an image space near-telecentric lens.

* * * * *